United States Patent [19]
Mills et al.

[11] Patent Number: 5,368,425
[45] Date of Patent: Nov. 29, 1994

[54] MULTI-AXIS LINEAR MOTOR POSITIONER WITH Y-AXIS SUPPORTED AT SINGLE END

[75] Inventors: Daniel M. Mills, Riverview; Richard Ogletree, Southfield, both of Mich.; Thomas J. Lindem, Rockford, Ill.

[73] Assignee: Ford Motor Company, Dearborn, Mich.

[21] Appl. No.: 924,692

[22] Filed: Jul. 31, 1992

[51] Int. Cl.⁵ ............................................. B23Q 1/02
[52] U.S. Cl. ................................... 409/235; 408/234; 409/191
[58] Field of Search ............... 409/235, 237, 190, 191; 408/234, 235

[56] References Cited
U.S. PATENT DOCUMENTS

| | | |
|---|---|---|
| 4,102,035 | 7/1978 | Voglrieder et al. |
| 4,178,834 | 12/1979 | Holmstrom ........................ 408/234 |
| 4,359,814 | 11/1982 | Pihery et al. |
| 4,392,642 | 7/1983 | Chitayat |
| 4,444,534 | 4/1984 | Bergman .......................... 409/235 |
| 4,505,464 | 3/1985 | Chitayat |
| 4,571,799 | 2/1986 | Chitayat |
| 4,761,876 | 8/1988 | Kosmowski |
| 4,985,651 | 1/1991 | Chitayat |

*Primary Examiner*—Daniel W. Howell
*Attorney, Agent, or Firm*—Joseph W. Malleck; Roger L. May

[57] ABSTRACT

A multiple-axis machine for positioning a rotary-driven spindle, such positioning being by use of linear motors. The machine has a support for defining multiple axes, with (i) a rigid vibration-dampening bed defining at least an X-axis; (ii) at least one hollow column defining a Y-axis and having one end adjacent and movable along the bed and the other end extending away from said bed; (iii) a slide adapted for movement along the Y-axis of the column; (iv) a cage rigidly fixed to the slide for defining a Z-axis way; and (v) a hollow ram slidable within the cage and along the Z-axis way and carrying the spindle. The machine has bearing assemblies interposed between the column one end and the bed, between the column and slide, and between the cage and ram to provide for respective relative movements along the axes, the bearing assemblies being preloaded to provide an interference fit of 10–20% of the maximum bearing loading. Linear motor assemblies are interposed between the column one end and bed, between the column and slide, and between the cage and ram, the linear motor assemblies are selectably actuatable to impose a linear thrust force upon any or all of the column, slide, or ram for respective movement along the axes. The ratio of the natural frequency of the support and bearing assemblies to the bandwidth of the control velocity loop is slightly greater than one.

23 Claims, 20 Drawing Sheets

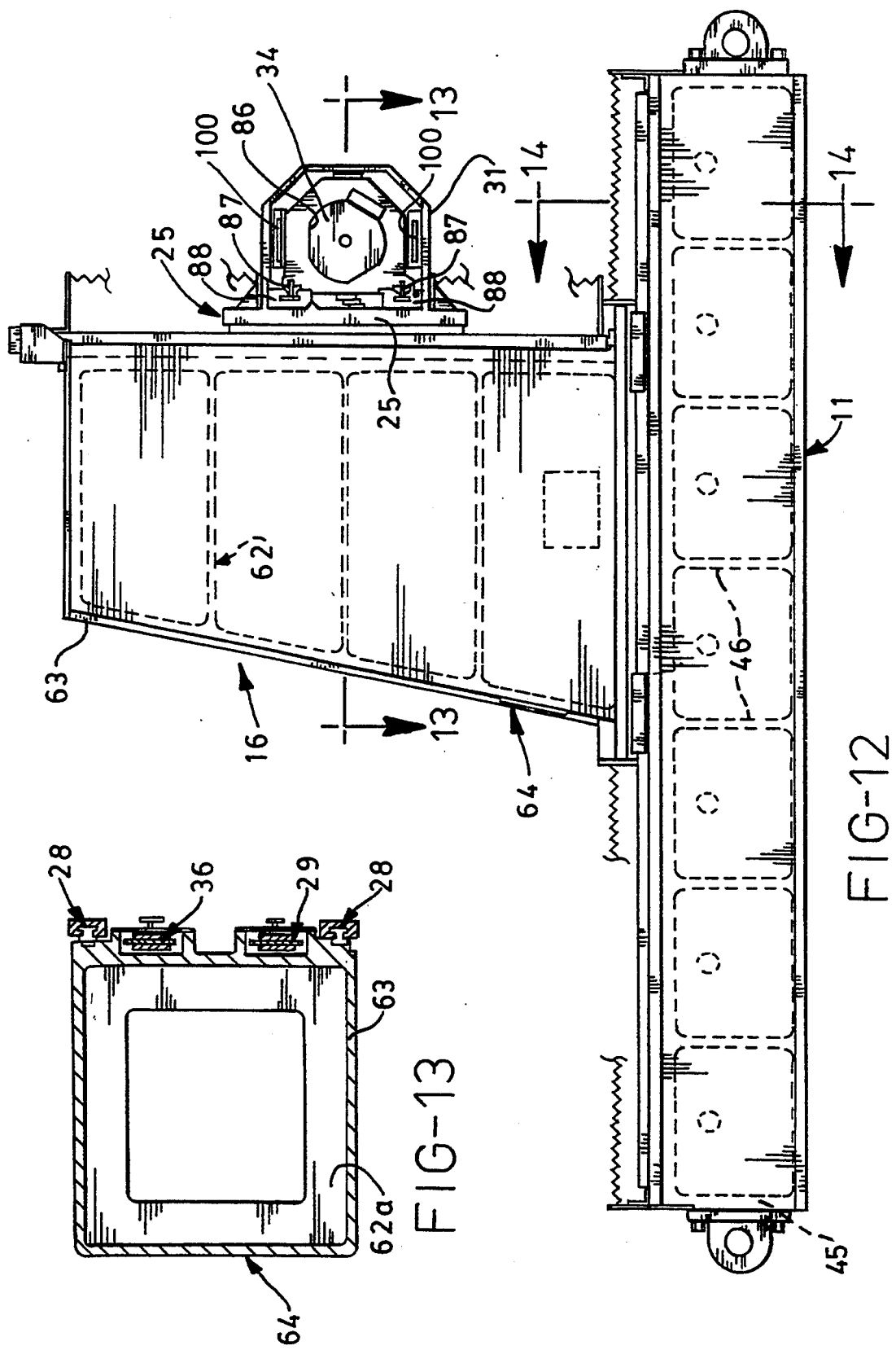

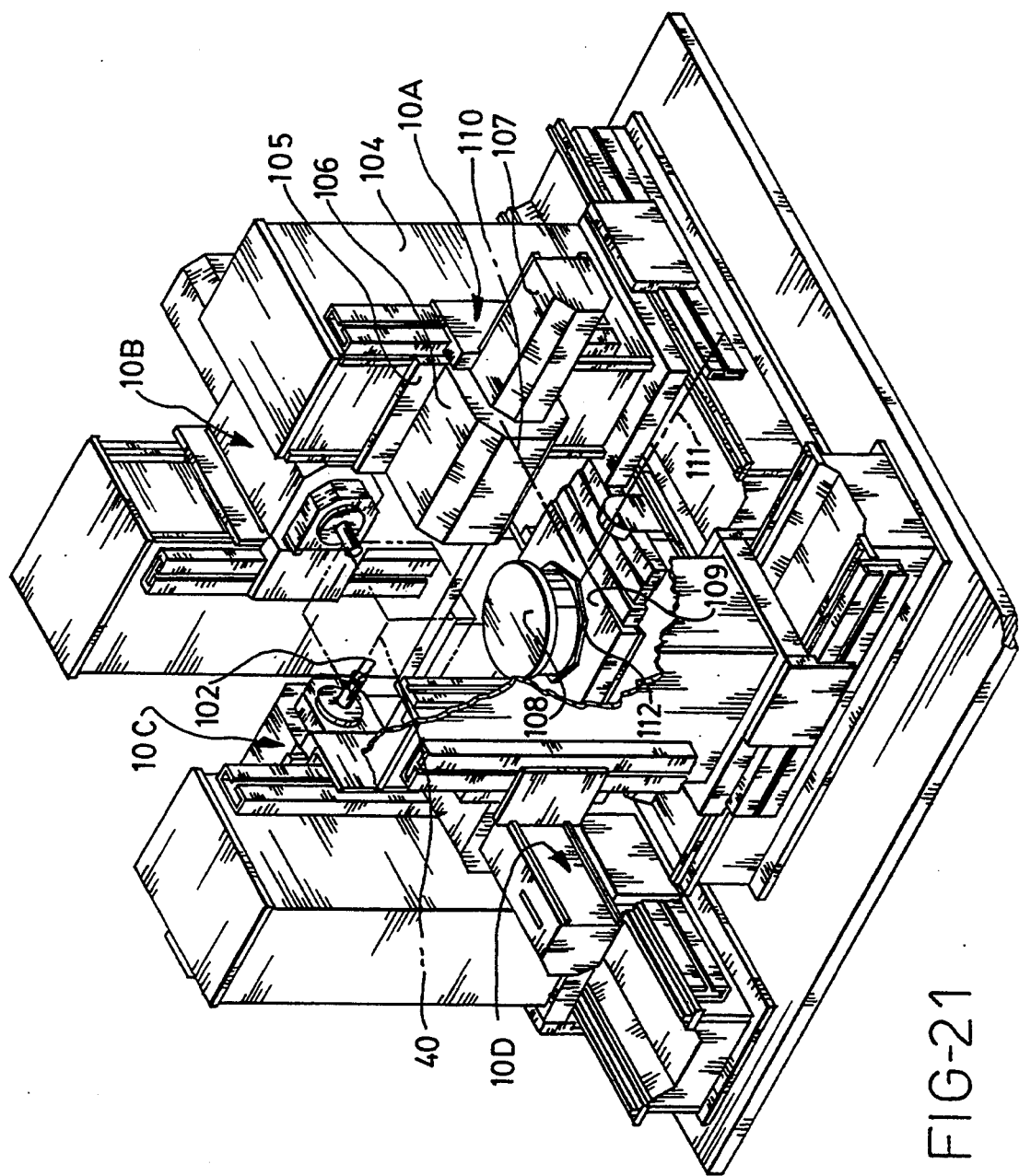

MULTI-AXIS LINEAR MOTOR POSITIONER WITH Y-AXIS SUPPORTED AT SINGLE END

BACKGROUND OF THE INVENTION

1. Technical Field

The invention relates to positioning assemblies using electrical linear motors and, more particularly, to such assemblies that accelerate and decelerate a movable working element at a rate approaching or exceeding one G.

2. Discussion of the Prior Art

Improving such positioning assemblies requires overcoming a two-fold problem: first, breaking the productivity barrier in machining or working a given workpiece through several operations without the necessity of dedicated tooling clusters, and, secondly, overcoming the inability to quickly and flexibly use tooling, particularly dedicated tooling clusters, for a variety of different workpieces. High-volume prior art machining lines, providing 500,000 machined units per year, or more, of one type, are not economical if marketing demand for such workpiece drops. Such lines use multiple-spindle turret heads, which are costly to change when modifying the line to machine other workpieces, and are limited to only one of either drilling, boring, or milling.

These problems can be overcome by use of a single-spindle machine having positioning accelerations 10 times faster than commercial machining cells. A high degree of flexibility can be achieved by eliminating product-specific pallets or worktables, dedicated cutting heads requiring replacement when workpiece changes are made, and utilizing unprecedented speeds not only to complete machining tasks but to change tools or fixtures from an adjacent bin. Timing for changing to a new product (workpiece) can be substantially reduced, requiring only software control modifications.

However, increased positioning accelerations or decelerations require strong thrust forces that detract from accurate positioning. Reducing the movable mass while maintaining stiffness of the relatively movable mass remains a problem to successfully and accurately position tooling at such unprecedented rates.

The prior art has confined the use of linear motors to positioning small, lightweight tools on granite bases or on rigidly-tied tandem axes (axes which are separated transverse to their own extent) (see U.S. Pat. Nos. 4,102,035 and 4,359,814). Little distortion of the supporting structure will be experienced with these devices, allowing use of bearings which contribute little to stiffness, such as air bearings and magnetic loading of mechanical bearings (see U.S. Pat. Nos. 4,392,642; 4,571,799; 4,985,651; and 4,761,876). Air bearings are undesirable because they require special support and guide surfaces that cannot be maintained in a heavy-duty, mass-machining environment for automotive component making, and are undesirable because they are insufficiently dimensionally stiff when deployed to move large tooling at high accelerations or decelerations.

Magnetic loading to increase guidance of a linear motor assembly has been used in conjunction with sliding or roller bearings (see U.S. Pat. Nos. 4,505,464 and 4,985,651). Magnetic loading of bearings does little to enhance stiffness because it is imprecise and weak; magnetic loading is primarily suited to a use that assists in following more closely a guided track and therefore does little to promote stiffness of the linear motor assembly.

SUMMARY OF THE INVENTION

The invention, in a first aspect, is a multiple-axis machine for positioning a rotary-driven spindle by use of linear motors. The machine comprises: (a) support means for defining multiple axes of movement for the tool by use of stacked movable elements having a predetermined mass; (b) preloaded bearing means interposed with and between said movable elements to provide an interference movement fit; and (c) linear motor means associated with said movable elements sufficient in force to apply a selectively variable acceleration or deceleration thrust to each movable element that overcomes the bearing preload and is effective to move said tool at a maximum rate of at least 0.5 G, and the linear motor means having a motor drive circuit with an operating frequency range close to but below the natural structural frequency of said support means.

Increased mechanical stiffness for such positioning machine is obtained by increasing the natural frequency of the support means to be slightly above the frequency of the bandwidth of the control velocity loop (motor excitation) and desirably at least above 100 hertz (Hz). This is achieved by use of one or more structural modifications, including: (a) reducing the mass of the supporting structure by use of finite element analysis and by use of lightweight, nonmagnetic metal, particularly aluminum; (b) increasing the spring rate of the support means by use of cellular skeletons having lightweight, nonmagnetic metal skins; (c) providing rails for the bearing means with super-stiff material; (d) integrating a ladder of hollow tubes along the slide side of the column; and (e) using a tapered, hollow structure for the ram, the taper decreasing the thickness the more remote the location from the spindle.

The positioning machine may further comprise at least one of (i) a flexible workpiece fixture positioning table that rapidly and accurately arranges the workpiece within a predetermined cubed machining space for a new machining task to complement the rapid repositioning of the machining tool carried by the positioner, and (ii) tool inventory suspended in a cubed space immediately integral or siamesed with the cubed machining space (preferably the cubes are side-by-side vertically or horizontally).

In a second aspect, the invention is a method of machining, comprising: (a) supporting a rotary-driven spindle and cutting tool by a plurality of stacked and relatively movable elements that provide for movement into and out of a predetermined sized cubed machining space; (b) actuating such relative movement by use of linear motors having a predetermined electrical power frequency slightly less than the natural frequency of the elements providing support, the linear motors being effective to linearly move the spindle at Peak accelerations of at least one G and at velocities of up to 2400 inches per minute; (c) deploying said peak acceleration movement to carry the cutting tool into the cubed machining space and to a location aligned with a machinable surface on a workpiece in said machining space; (d) using the linear motors to advance the cutting tool at feed rates below the peak acceleration but at feed speeds up to above 240 inches per minute for drilling, up to 300 inches per minute for boring, and up to 500 surface feet per minute for milling; and (e) upon completion of the machining task, withdrawing and repositioning the cutting tool at peak acceleration rates to a new location confronting the workpiece for carrying out a new machining task.

BRIEF DESCRIPTION OF THE DRAWINGS

FIG. 12 is an elevational view of an alternative embodiment of the single positioner of this invention;

FIGS. 13 and 14 are, respectively, sectional views taken along lines 13—13 and 14—14 of FIG. 12;

FIG. 15a is a schematic perspective view of a recirculating bearing unit shown broken-away in certain portions thereof;

FIG. 15b is a partial cross sectional view of FIG. 15a;

FIG. 21 is an overall perspective view of a machining cell for a single workpiece utilizing a plurality of spindle positioning machines.

DETAILED DESCRIPTION AND BEST MODE

Figure 1:
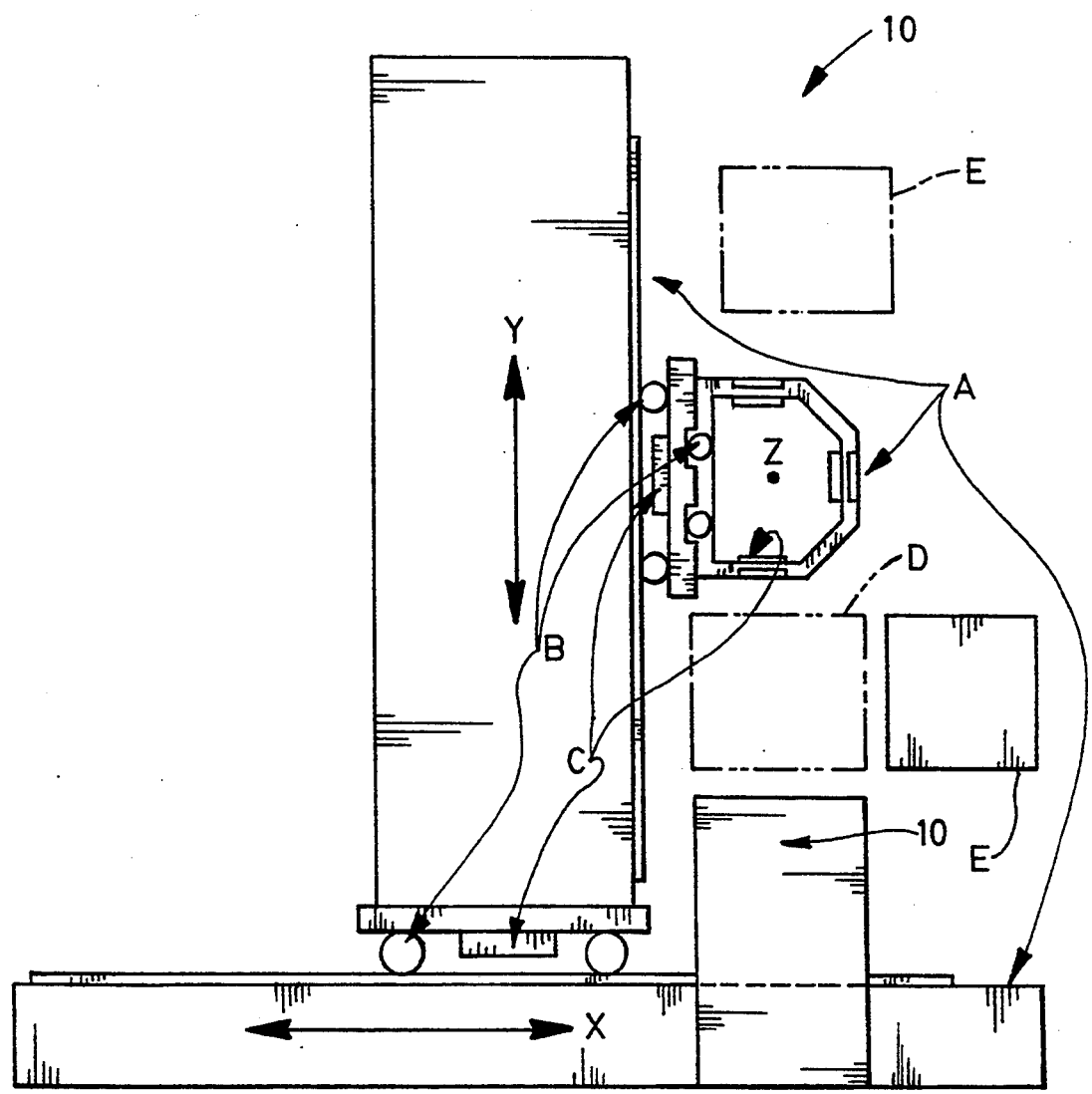
FIG. 1 is a schematic view of the primary support elements of the positioner of this invention.
Figure 2:
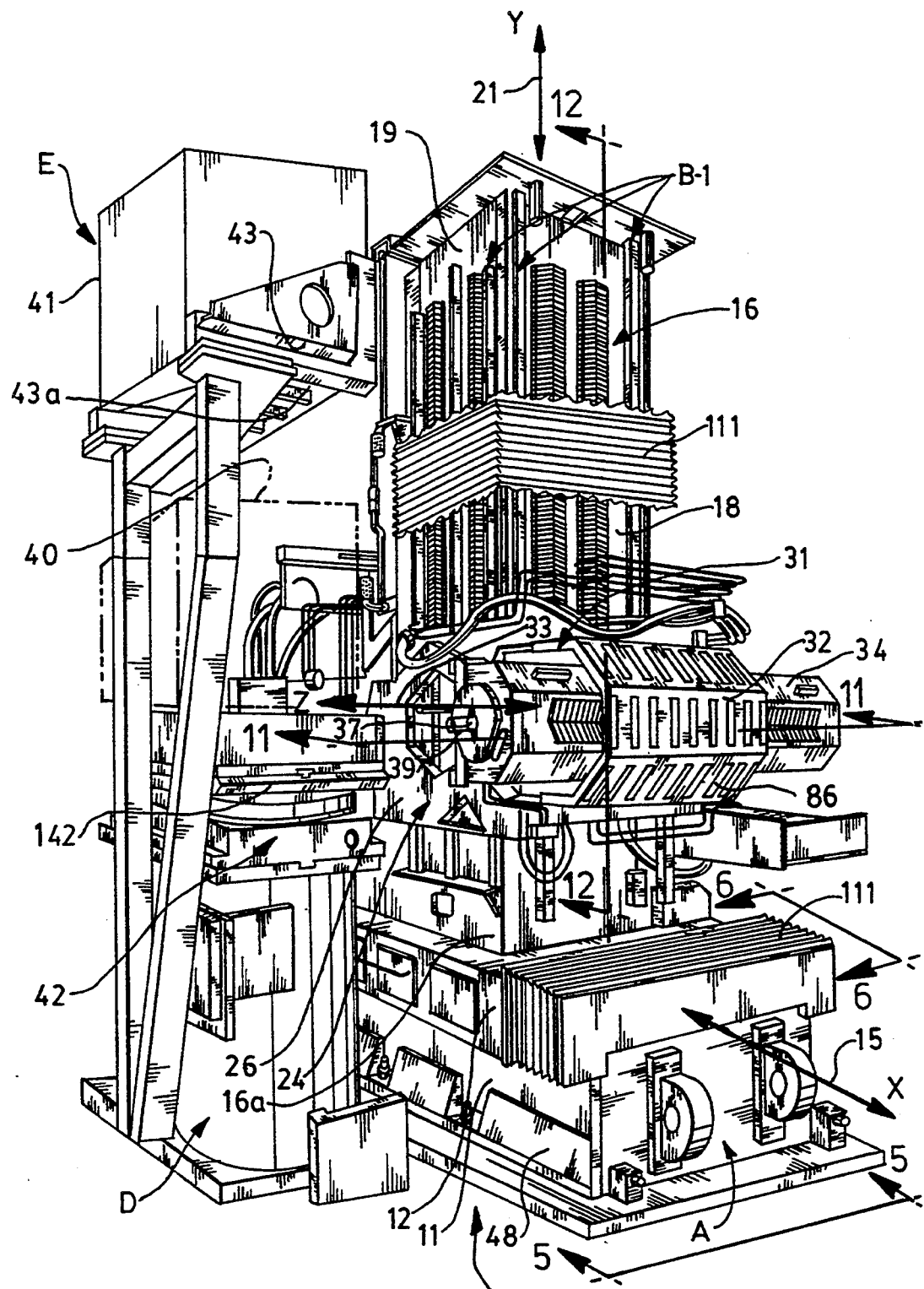
FIGS. 2 and 3 are overall perspective views of a machining system employing a three-axis linear positioner of this invention, the figures being taken from different frontal positions spaced angularly apart about 90 degrees.
Figure 3:
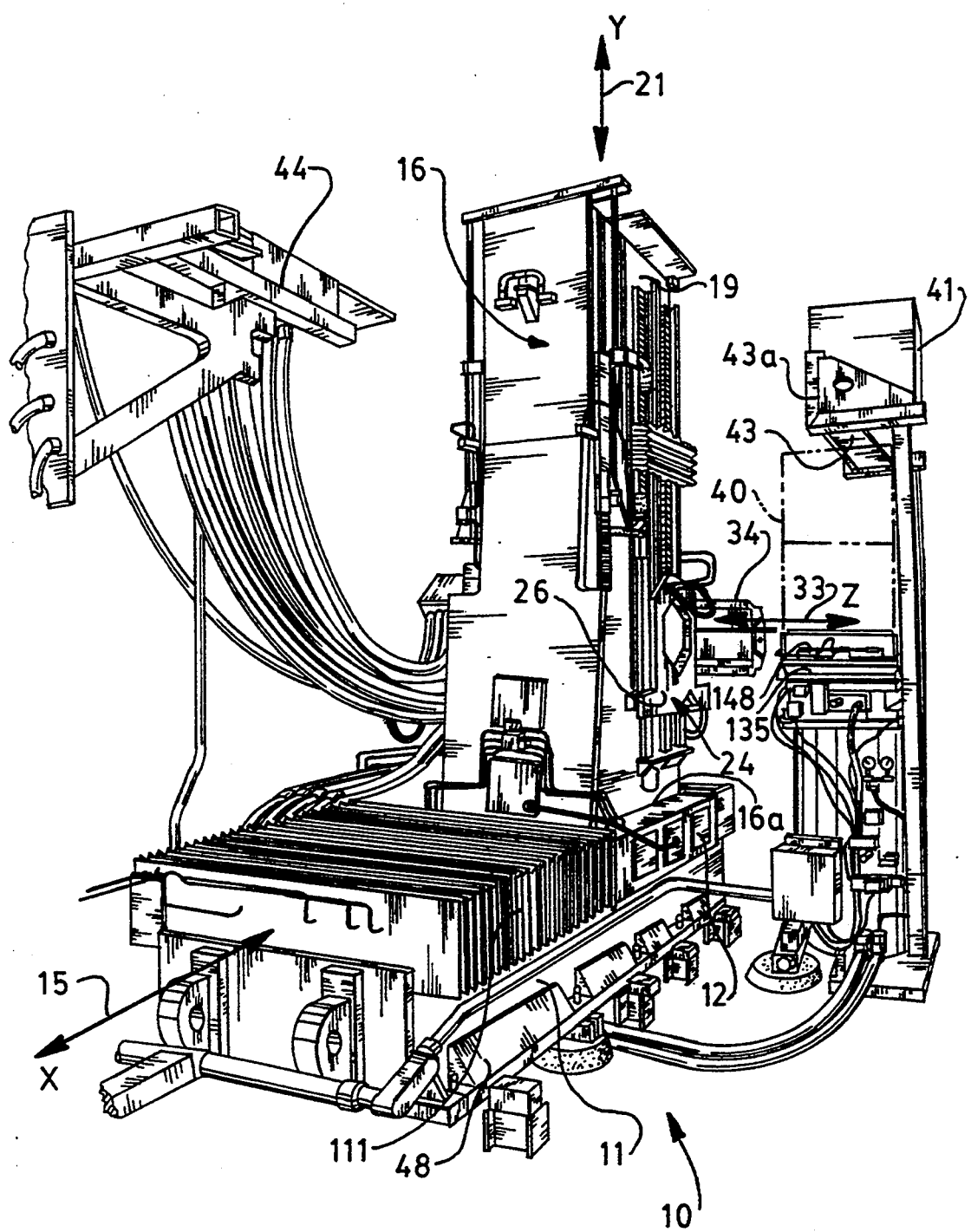
Figure 4:
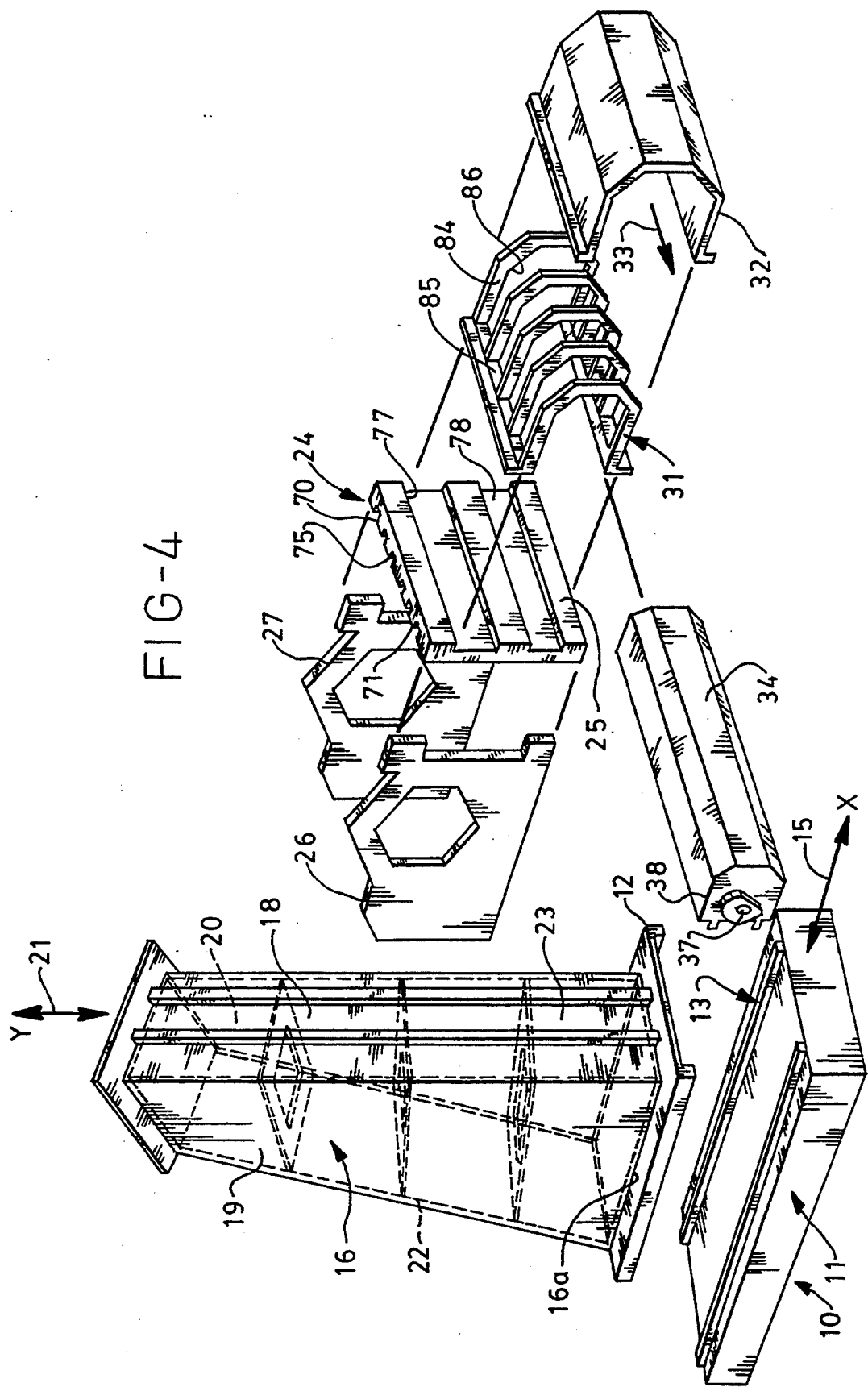
FIG. 4 is a schematic exploded view of the principal members of the support means for the positioner of FIGS. 2 and 3.
Figure 5:
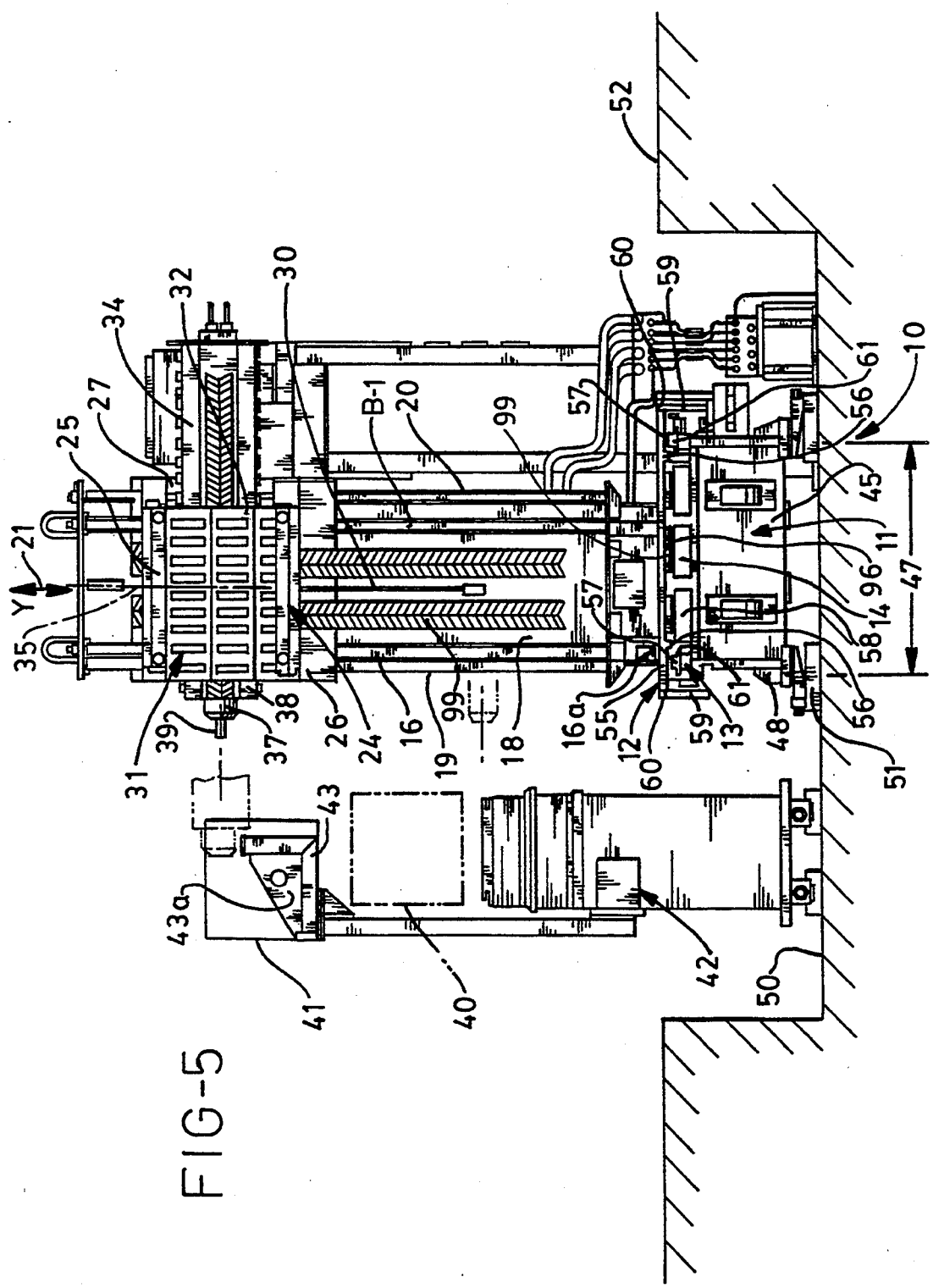
FIGS. 5 and 6 are elevational views of the structure shown in FIG. 2 taken in the direction as indicated by the respective arrows in FIG. 2.

The basic elements and architecture of the three-axis linear motor positioner 10 of this invention are shown in FIG. 1; they comprise a multi-axis support assembly A, bearing and rail assembly B, linear motor assembly C, workpiece support and machining zone D, and a tool inventory E. Note that the major movable elements of the support assembly are stacked on a platform 12. As shown in FIGS. 2–4, support assembly A has a first portion for defining an X-axis comprising a vibration-damping, heavy, reinforced, sand-filled rectangular bed 11 that supports a lightweight metal table or platform 12 by way of a bearing and rail assembly B-1 as well as a linear motor assembly C-1, both between such table and bed for movement in a plane along the X-axis 15. Secondly, an upright, essentially hollow column 16 is supported at its bottom end 16a on table 12 (see FIG. 4). The column has at least one side 18 (here sides 18, 19, 20) aligned with a Y-axis 21 that is perpendicular to the X-axis 15. Thus, the Y-axis support structure (16) is connected to the movable X-axis structure (12) at only one end. The hollow column 16 is constituted of a lightweight metal skeleton 22 about which is stretched an integral lightweight metal skin 23. A lightweight metal slide 24 is formed principally as a cast planar plate 25 with optional attached (or integral) lightweight metal wings 26, 27. The slide rides up and down the Y-axis sides (18, 19, 20) of the column by way of a rail and bearing assembly B-2 as actuated by linear motor assembly C-2 (see FIG. 8), counterbalanced by an assembly 30 (FIG. 5). Thirdly, a lightweight metal cage 31, preferably carrying an ultra-lightweight composite skin 32, is fixedly carried on the slide 24 to define a Z-axis way 33 that is mutually perpendicular to the Y and X axes. Alternatively, the cage 31 may be angularly adjustable to align the Z-axis at an angle with respect to one of the Y or X axes. A lightweight, hollow metal ram 34 is movable within way 33 and supported therein by way of rail and bearing assembly B-3 and linear motor assembly C-3. The ram 34 fixedly carries a spindle 37 at one end 38 thereof with a rotary-driven tool 39 exposed for conducting machining tasks such as milling, drilling, and boring.

As part of the workpiece support D, an adjustable workpiece table assembly 42 is stationed adjacent the three-axis positioner to flexibly support a workpiece 13 in a defined cubed machining space 40, i.e., two-foot cube. As part of structure E, an overhead rail 43 may be used to support a tool inventory rack 43a in a cubed inventory space 41. Spaces 40 and 41 are desirably integral and siamesed. A hanger 44 is used to hold hoses and electrical cables in suspension for flexibly connecting to the linear motors and bearings.

Movability of the tool positioner is characterized by: (a) supporting the Y-axis at one end only; (b) integrating the Z-axis cage on a slide movable along the Y-axis; and (c) proportioning all the axes to achieve not only movement of the cutting tool within a predetermined cubed machining space 40, but also to and within a siamesed, cubed tool inventory space 41.

Support Assembly

Figure 6:
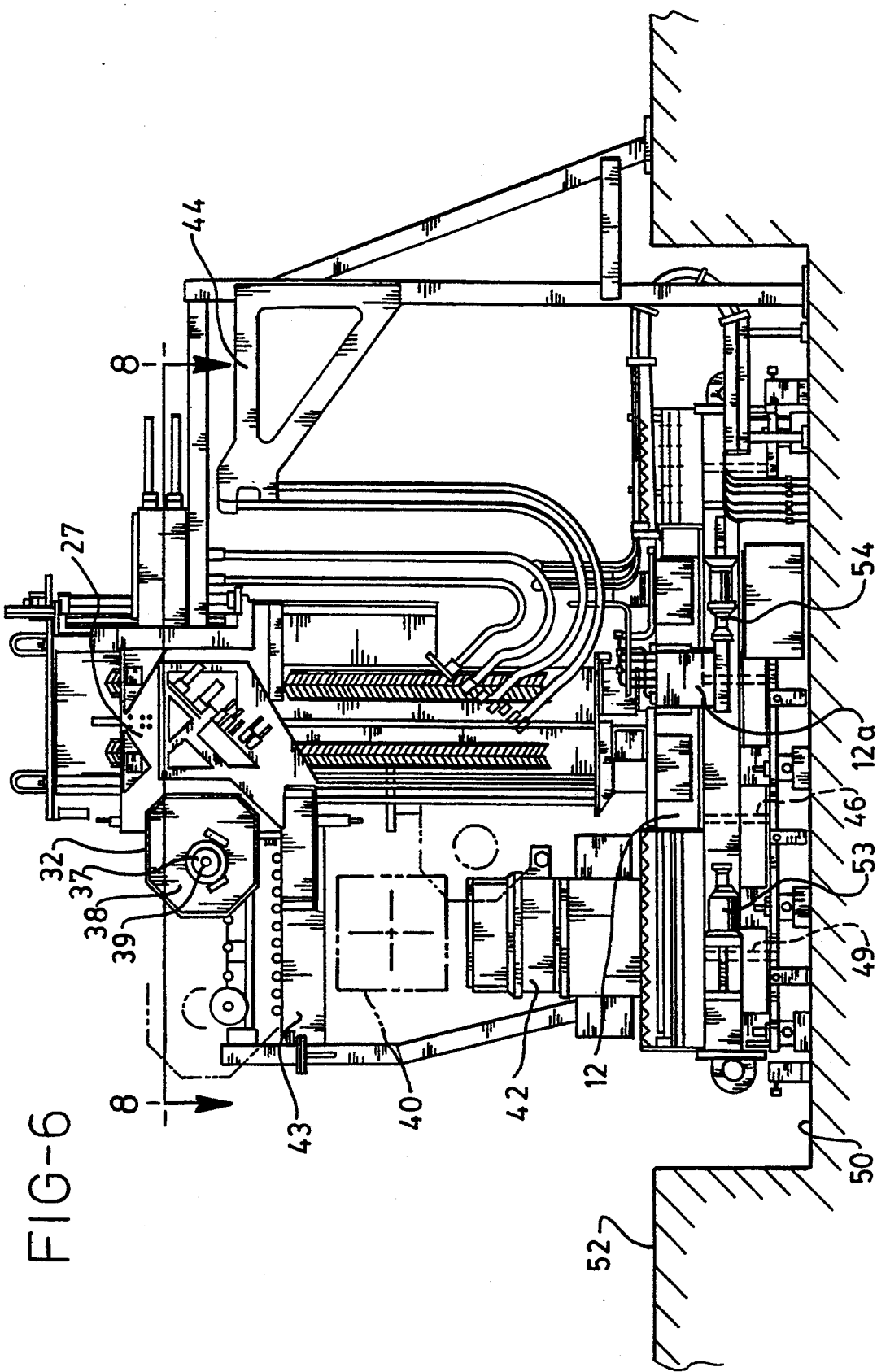
Figure 7:
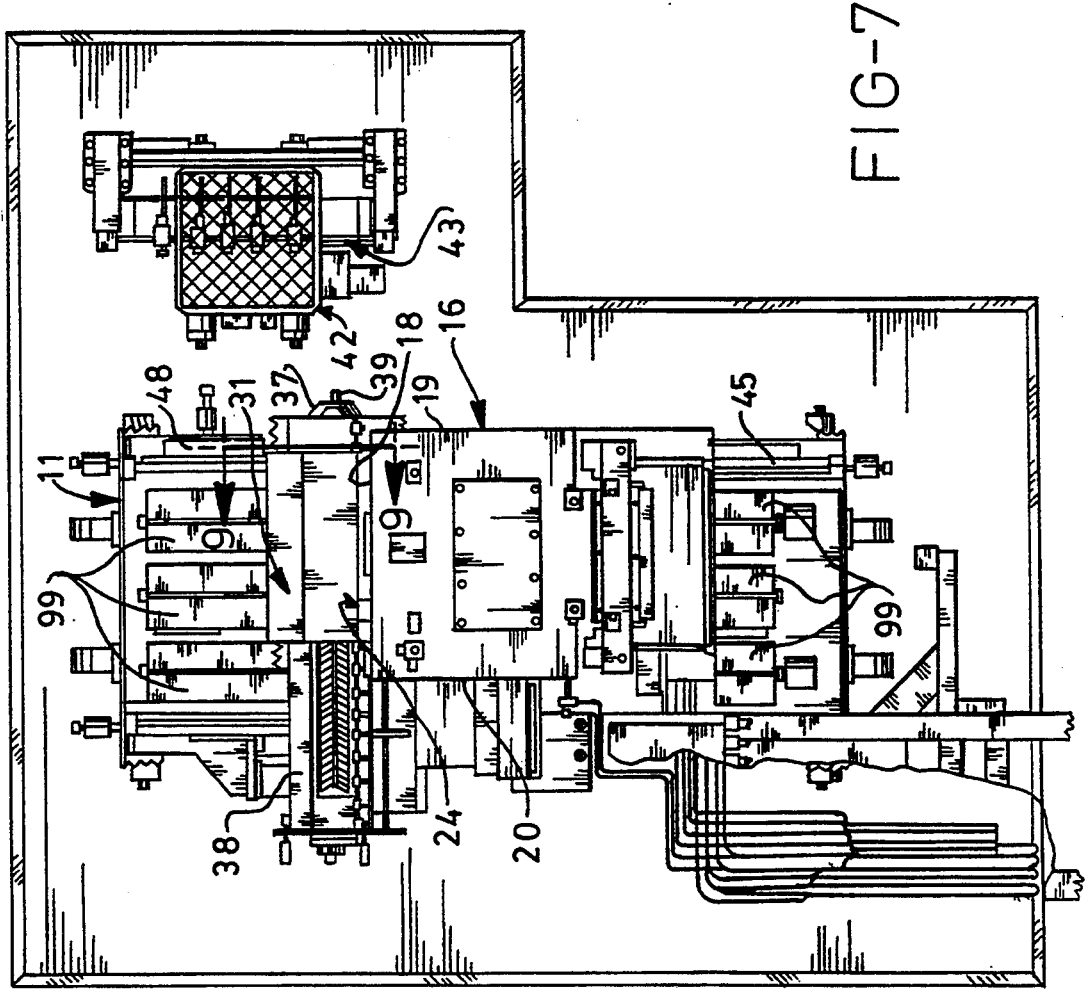
FIG. 7 is a plan view of the structure of FIG. 2.

As shown in FIGS. 5–6 and 12, the bed 11 is constructed as an open box of thick steel side plates 45 and a plurality of thick steel internal webs 46 extending across the narrow width 47 of the box. Note, as shown in FIG. 5, the central axis 35 of the column is positioned off-center of the bed. Angular gussets or braces 48 are welded to reinforce the box structure at its platform 49. The platform is anchored to a recessed foundation 50 at 51, the top of the movable table 12 being aligned with the main foundation floor 52. Stops 53 and 54 are employed to limit the X-axis travel of the table 12 (via flange 12a) to correlate with the sides of the cubed machining space 40. Table 12 (as shown in FIG. 5) is a flat plate 55 having elongate shoulders or ribs 56 on its underside for retaining bearing units 57 as part of assembly B-1 and coil packs 58 as part of assembly C-1; plate 55 has skirts 59 depending from opposite edges 60. Spaced, ultra-stiff (i.e., hardened steel) rails 61 (part of assembly B-1) are secured to the bed and aligned with the X-axis. Rows of permanent magnets 99 (part of assembly C-1) are carried on the downwardly facing wall 14 of the table (see FIG. 5) and are bonded to steel plates or channels 28, which encourage a flux path through the adjacent magnets.

Figure 10:
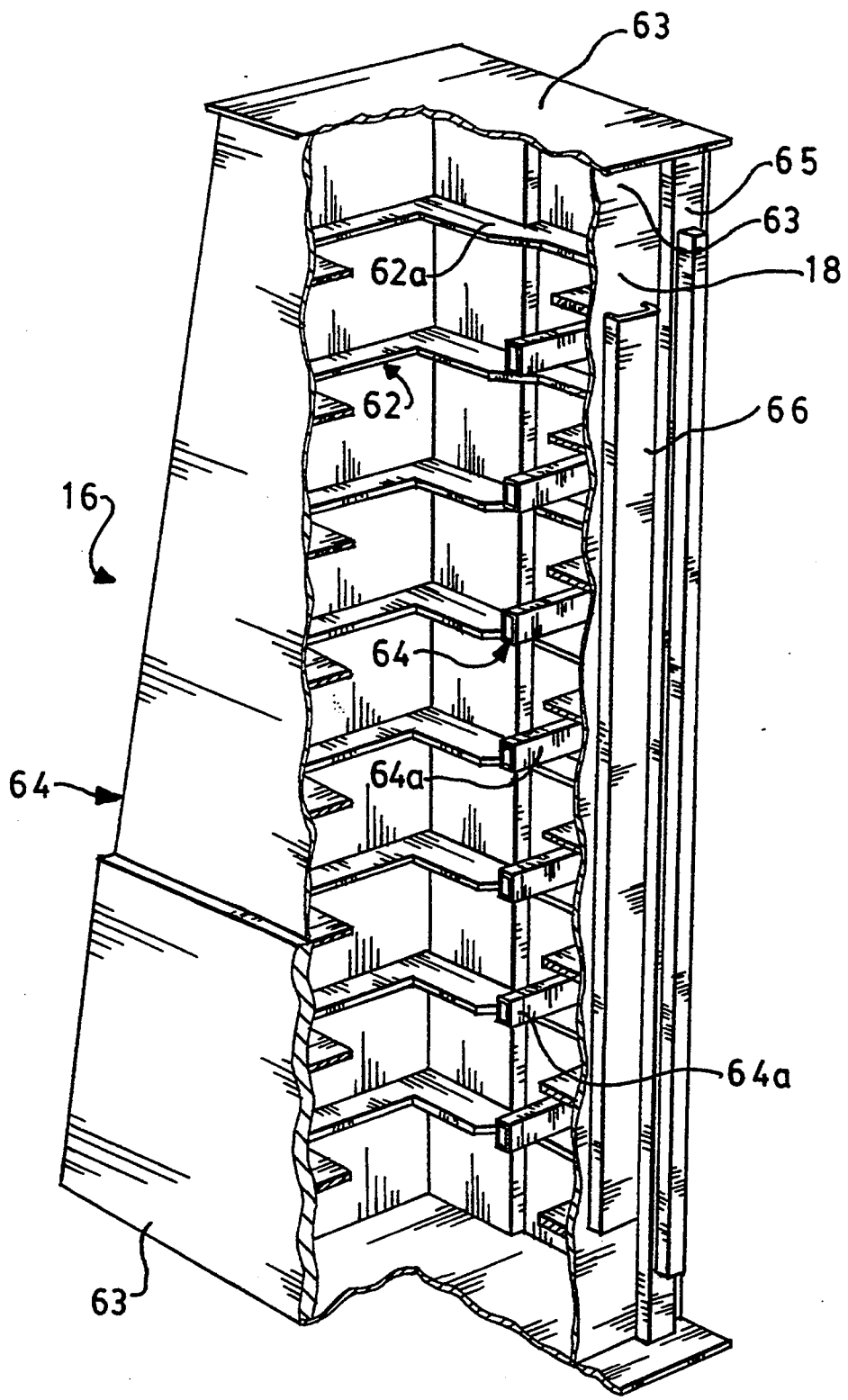
FIG. 10 is a schematic cut-away perspective view of essential elements of the column of the positioner.

Column 16, as shown in FIGS. 10 and 12, is preferably constructed with a cellular skeleton 22 of cast lightweight, nonmagnetic metal, such as aluminum, and upon which is stretched a lightweight metal skin 63. Column 16 has side 36 slanted with respect to the Y-axis to increase stiffness by widening the cross-section of the column the Closer the section is to the bed 11. Each cell of the column has bulkheads or struts 62 extending across the section, each bulkhead having a thickness of about one inch. A solid plate is secured to the top of the column for strengthening. A ladder 64 of tubes 64a is attached to the interior of side 18 to strengthen the skin 63 and front support 65. The ladder of tubes adds concentrated stiffening of the skin. Plates 66, for attaching a plurality of permanent magnets 67, are spaced and aligned vertically in pairs on each side 18, 19, and 20 of the column. Rails 68, 69, for operating the bearing units 73, 74, are aligned vertically and secured to the column in pairs, as shown.

Figure 14:
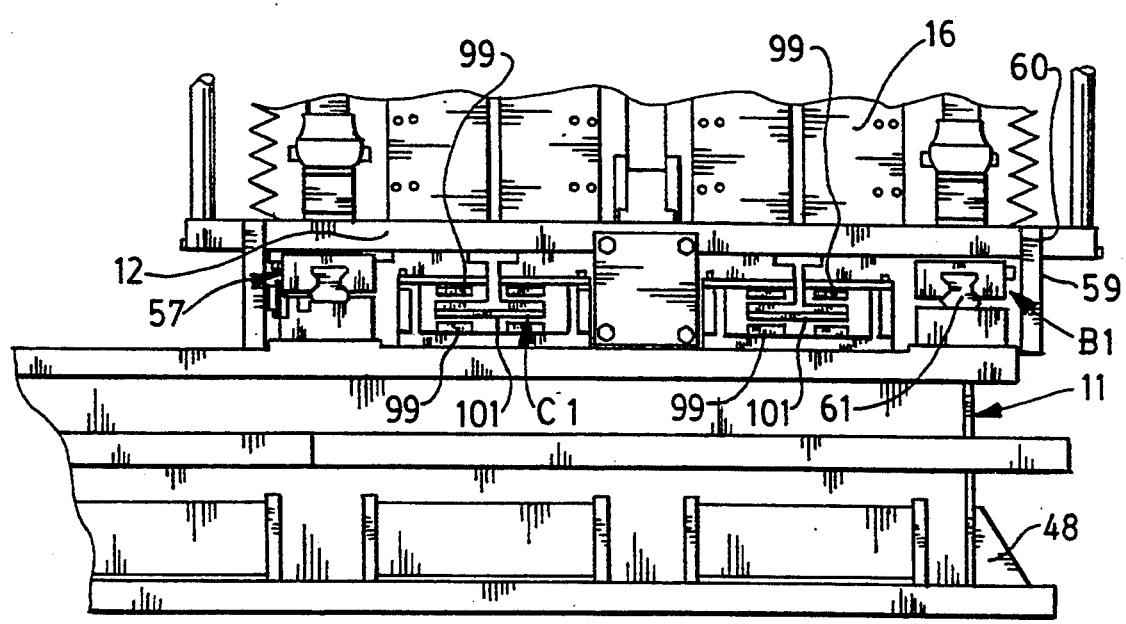

The structure shown in FIGS. 12–14 is an alternative modification wherein the Y-axis is considerably shortened and the X-axis is considerably increased. This necessitates that the machining cube space be lower and the tool inventory space be horizontally aligned with the machining space. Note the use of a reduced number of linear motor coil packs: two dual, opposed coil packs at each of 82 and 83; the use of two single coil packs 100 at opposite sides of the cage 31 which promote a balanced application of thrust force; and only two coil packs 101 in side-by-side arrangement for column movement (see FIG. 14).

Figure 8:
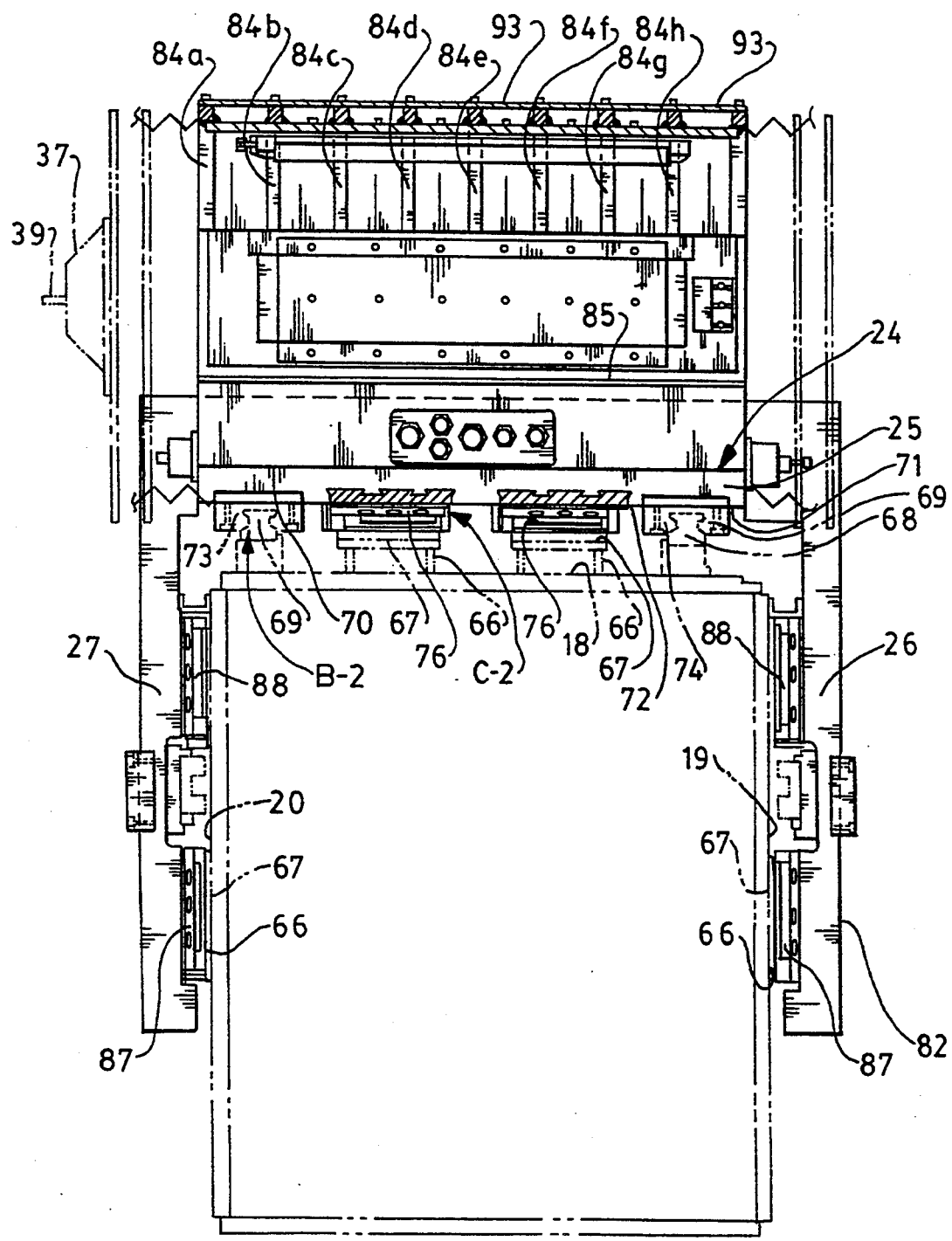
FIG. 8 is an enlarged sectional view taken substantially along line 8—8 of FIG. 6.
Figure 9:
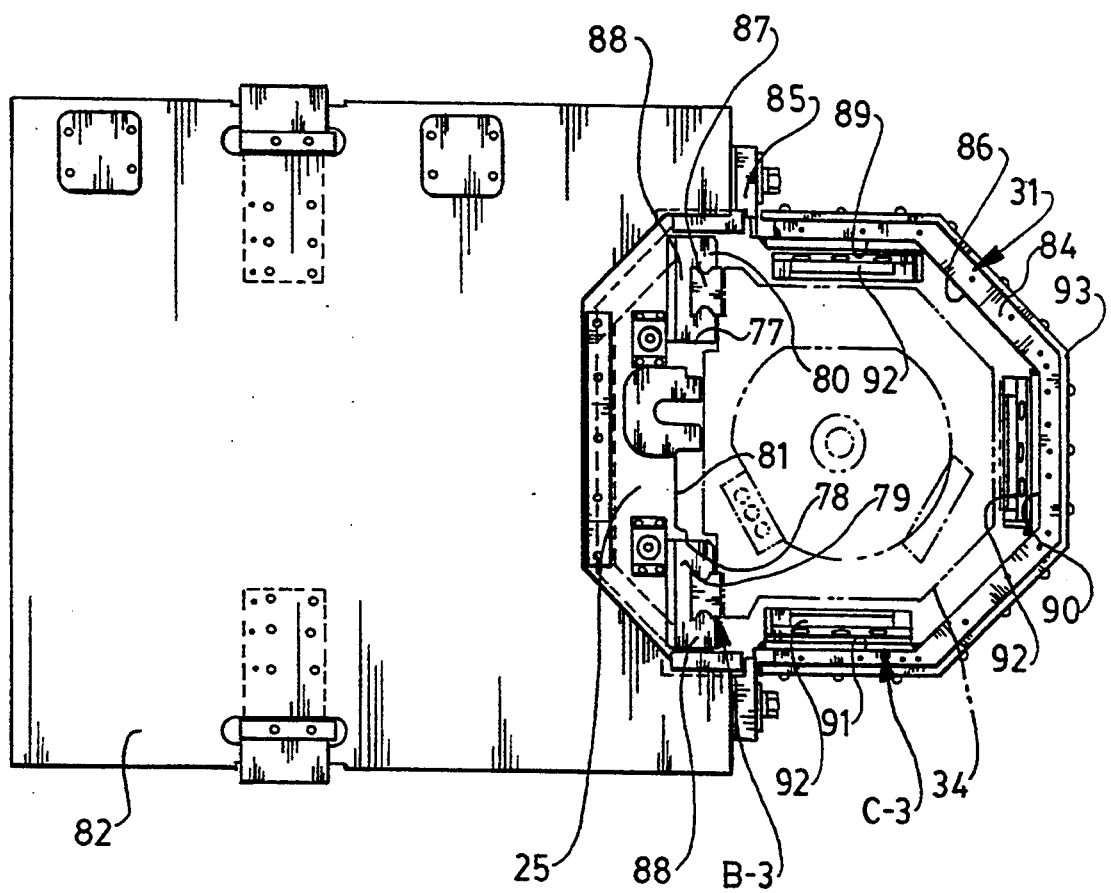
FIG. 9 is a sectional view taken substantially along line 9—9 of FIG. 7.

The slide 24, as shown in FIGS. 4, 8, and 9, consists of a plate 25 cast of a lightweight, nonmagnetic metal (i.e., aluminum) with upright receptacles 70, 71 (see FIG. 8) on the backside 72 thereof for fixedly securing recirculating bearing units 73, 74 which operate with rails 68, 69. A plurality of upright dovetail slots 75 are defined to lock-in-place coil packs 76 of linear motors on the backside thereof. Horizontally extending ways 77, 78 (FIG. 4) on the front side of plate 25 receive recirculating bearing units 79, 80 (see FIG. 9); between ways 77, 78 is a channel 81 for housing a scale. The wings 26, 27 are each cast as a solid, thick, cropped plate (or as a built-up fabrication of a plate with rib braces). Spaced pairs of linear motor coil packs 87, 88 are mounted side-by-side on the interior of each of the wings and spaced side-by-side coil packs 76 on the plate to effect movement along the Y-axis in cooperation with six rows of permanent magnets 67.

As shown in FIGS. 4 and 8–9, rib cage 31 (two-axis coil carrier) is comprised of a plurality (here nine in number) of parallel, separated, cropped bulkheads 84 integral with a web 85 at one side; each bulkhead has a central opening 86, all the openings being coaxially aligned. The web 85 has secured thereto vertically spaced, horizontally extending rails 87; recirculating bearing units 79, 80 are mounted on the slide 25. Bulkheads 84a–h (see FIG. 8) provide support and mounting for linear motors. The rib cage 31, when combined with a graphite composite shell 93 reinforced with metal stays 86 at longitudinally spaced locations, creates a semihexagonal-shaped tunnel. At three interior sides 89, 90, and 91, coil packs 92 are mounted on the cage 31 (although two opposed coil packs can be effectively used, as shown in FIG. 12).

Linear Motors

Each linear motor deployed between the support elements of the positioner consist of a stator (preferably coil packs such as 58 on the bed 11) and a linear moving element (preferably rows of supported permanent magnets such as 96 on the table 12). The linear motor are brushless DC motors having a peak thrust force of 1000 pounds (high-force). The permanent magnets and coil packs can be interchanged between stator and movable element in any specific design application. In the embodiment illustrated herein, electric power supplied coil packs form the stator on the fixed bed and form the stator on the cage 31 which is fixed in the Z-axis, whereas rows of supported permanent magnets form the stator on the column which remains fixed along the Y-axis.

Figure 16:
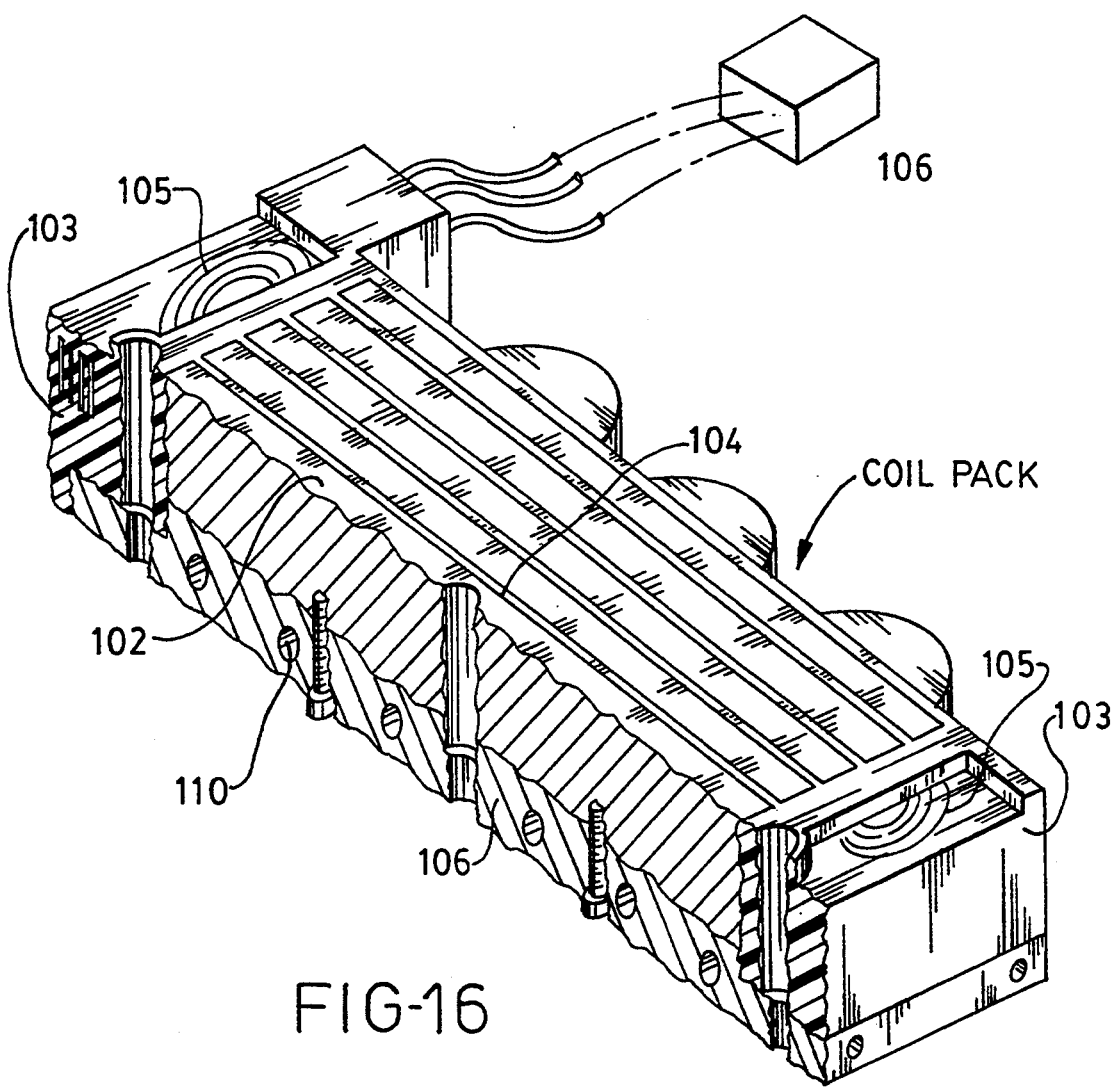
FIG. 16 is a schematic perspective view of a linear motor coil pack shown broken-away.

The coil packs (as shown in FIG. 16) are constructed of ferromagnetic plates 102 laminated in an epoxy material 103 to provide slots 104 in which coil windings 105 are deposited prior to lamination. Potting techniques are used to carry out the lamination so that the coils are embedded in a material substantially devoid of bubbles or contaminants which inhibit heat transfer and thereby decrease the life of the coils. The coils may be connected in series within a pack and the packs connected in parallel to a power control 106. Such control 106 may supply the coils with two, three, or more phases; suitable commutation is used to change the polarity of the coils to keep a constant electromagnetic thrust force in one desired direction to promote linear motion.

Figure 17:
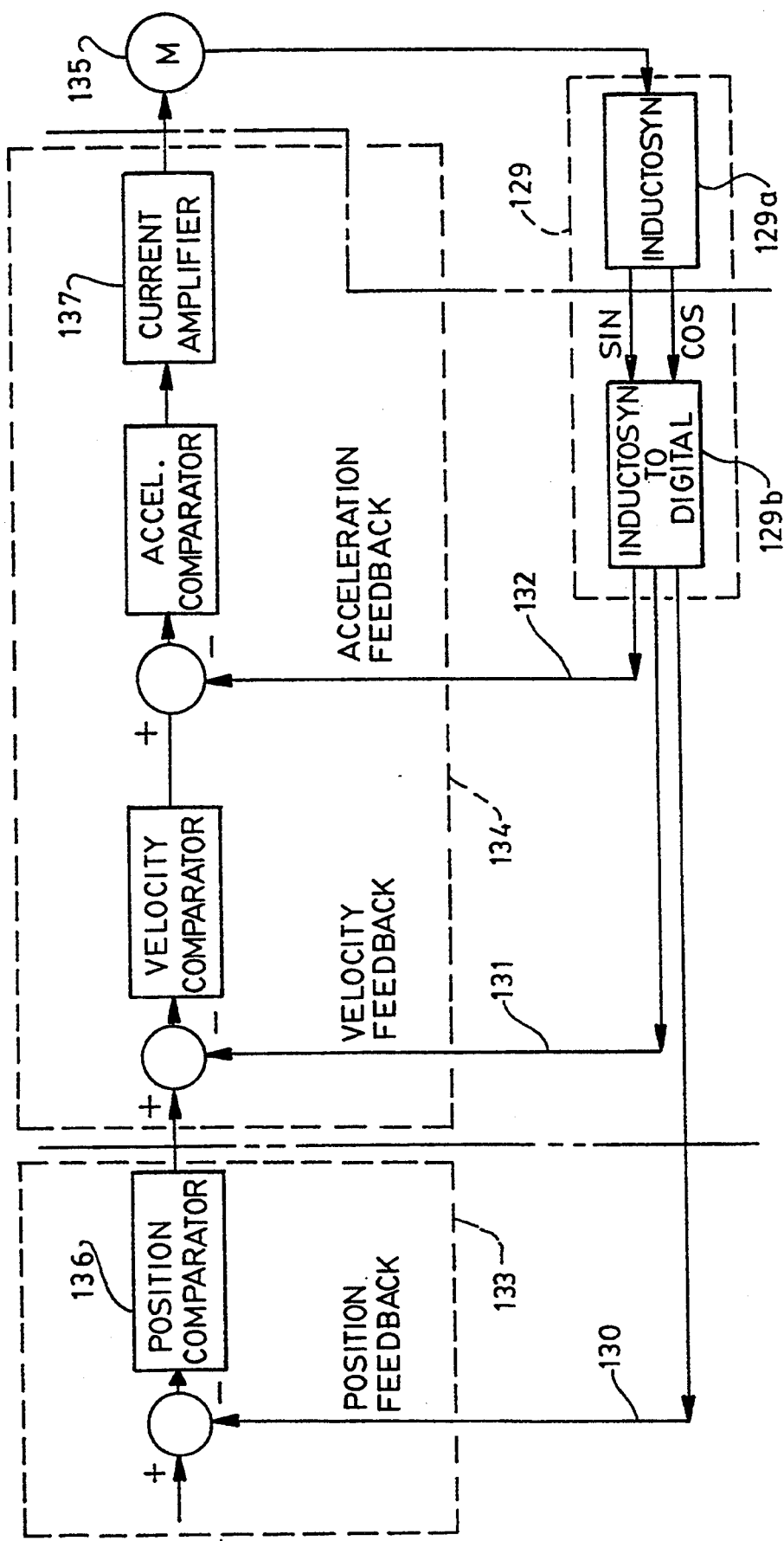
FIG. 17 is schematic block control diagram for the linear motors.

Sensors are used to detect the position of the movable elements and send signals to allow the power control 106 to activate or control only those coils needed in the region of movement. Such sensors can be magnetic or optical, and are operable with a switching system for the coils. A preferred control embodiment is shown in FIG. 17, using a magnetic sensor (scale). The power control 106 for each linear motor comprises (as shown in FIG. 17) a magnetic scale device 129, a numerical control device (CNC) 133, and an electronic switching device 134, all connected electrically in series with the linear motor 135. Three motor circuits or feedback loops 130, 131, and 132 incorporate at least two of these devices. Feedback loop 130 connects the linear motor with scale 129, and the output signal of the scale is carried through a null adjuster to a position signal comparator 136 and thence to a current amplifier 137 driving the motor 135. The scale 129 has sine and cosine windings (printed circuits) on a stator 129a and another winding on a rotor 129b. The impedance of the winding is inversely proportional to the position (length) along the scale. The output signal from the rotor winding 129b is a function of the position of such winding relative to the two other windings of the stator 129a. The output signal can give a mechanical motion indication, or the rate of change of the induced current in the rotor winding can give a velocity signal for loop 131 or an acceleration signal for loop 132.

Cooling channels 110 are incorporated into a ferromagnetic platform 101 that is in intimate contact with each of the core plates 102. Cooling fluid is forced through the channels to dissipate high heat generated by the motor induction, such cooling supplementing any convective cooling achieved by circulating a gas about the motor coil packs, such circulation being facilitated by bellows 111 acting as an entrainment.

For the embodiment of this invention, the power supply for the coil packs is desirably 460/480 VAC, three-phase, 60 Hz power supply, utilizing plastic power tracks. It is desirable that the coil packs be on the fixed member of the motor to reduce hose and cable flexing.

As shown in FIGS. 2-3 and 5-7, the permanent magnets (such as illustrated on the column) are arranged in rows with pairs of permanent magnet parts 107, 108 placed side-by-side with the same polarity abutting; the abutting polarity alternates in the next level down the row. Thus, for example, north poles abut in the first level, south poles abut in the second, north poles abut in the third, and so on. Each of the magnets in a pair is skewed approximately 15 degrees to the centerline of the row. Each magnet has a physical size of about 2-3 inches in length and ¾ to 1¼ inches in width.

The permanent magnets (such as 96 in FIG. 5) are preferably comprised of a rare earth composition, such as the NdFeB type, providing an unusually high flux density.

The coil packs are shown in spaced side-by-side arrangement: three for moving the column (see FIG. 5); six on three wrap-around sides for moving the slide 24 (see FIG. 8); and three on three sides of the cage for moving the ram 34 (see FIG. 9). However, the coil packs may advantageously be arranged back-to-back, requiring a lesser number of units such as two back-to-back units for moving the slide (see FIG. 13), two back-to-back units for moving the column (see FIG. 14), and two opposed motors for moving the ram (see FIG. 12). Back-to-back coil arrangements permit the flux paths to cooperate rather than detract from each other, thus reducing the weight of the motor for a given thrust force. Such back-to-back coil packs use a T-shaped flange to connect to the movable element.

The counterbalance 30 uses high pressure nitrogen (1000 psi) to counterbalance the slide/cage and column. The counterbalance uses a stationary rod 29 and moving cylinder 109. Shock absorbers 12 are incorporated for preventing over-travel. Counterbalance is necessary along the Y-axis during inactivity of the positioner, the weight of such movable elements being restrained during such inactivity. The counterbalance is easily overcome by the thrust of the linear motors during actuation in any machining task to return nitrogen to a reservoir.

Rail and Bearing Assembly

Figure 15:
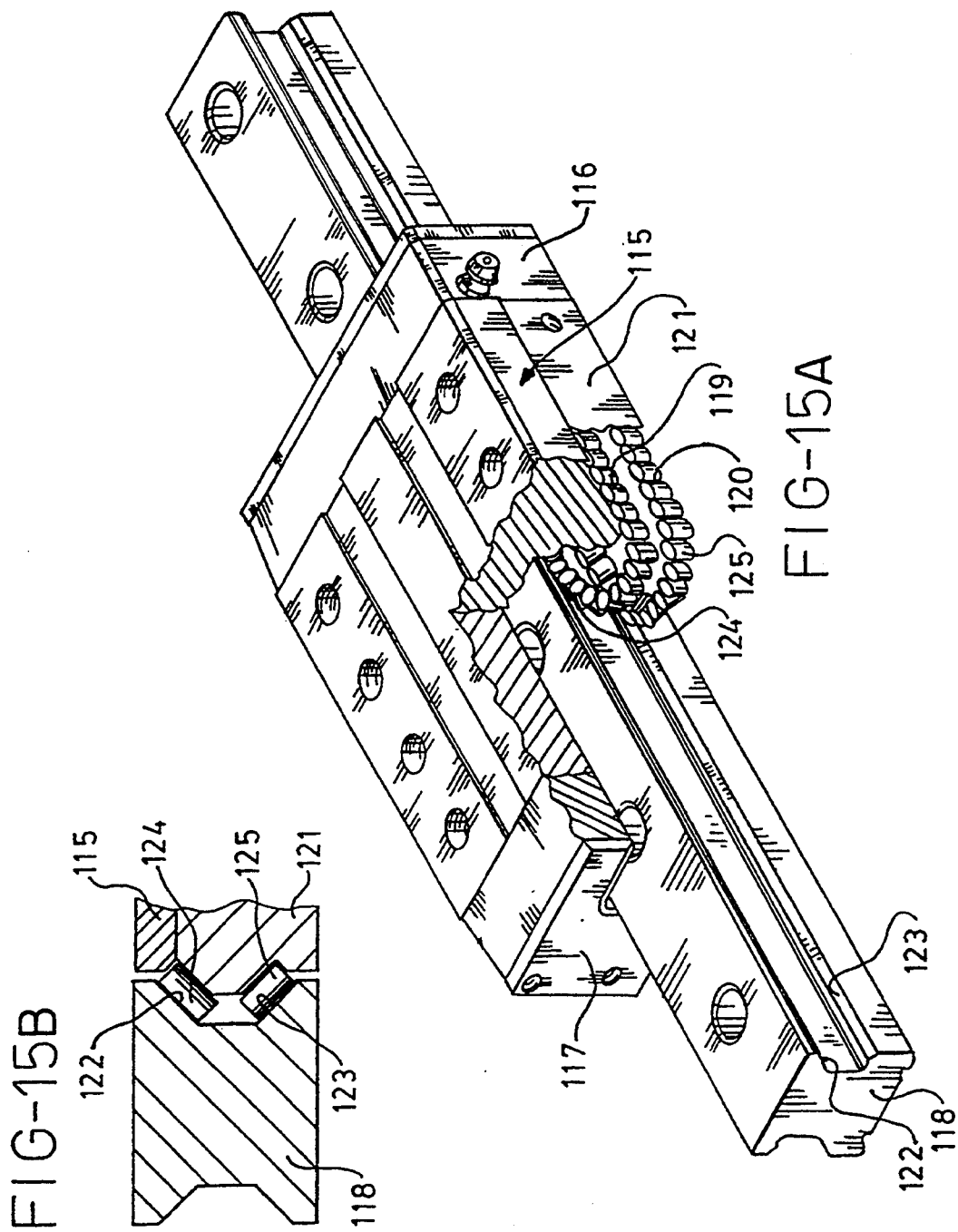

As shown in FIG. 15, each assembly B comprises a recirculating bearing unit 113 and a rail 118; the unit 113 has casing 115 preferably secured to one of a pair of relatively movable elements such as the X-axis table and bed or the X-axis slide and column. The casing or race 115 has depending side portions 116, 117 that wrap around the rail 118, the rail being secured to the other of the relatively movable elements. The rail is preferably shaped as an "I" in cross-section. The casing has a plurality of grooves 119, 120 in each portion 116, 117; the grooves form recirculating tracks in cooperation with an outside track cover 121 and the canted bearing surfaces 122, 123 on the inside corners of the rails. A V-shaped retainer 124 supports the bearing rollers 125 as they roll onto the canted surfaces. Such bearing assembly has here four recirculating paths, each path recirculating the bearing rollers about an axis generally parallel to the roller axes, except where the axes of the bearing rollers are canted about 45 degrees from their normal position on the inside.

The contact between the bearing rollers and the rail surface should be at a controlled interference fit. Such fit is defined to mean that primarily the bearing, races, or cages, and secondarily the casing, rollers, and rail deform below the yield point of the metal to accommodate roller movement. This deformation enhances the accuracy of positioning without increasing weight of the structure. Such interference fit is obtained by preloading the bearings such that the point or line contact of the bearings are under a load of at least 1000 psi, the interference preloading applying an additional 10-20% of the maximum load supported by the bearing. The preloading is such that the bearings exert 25-33% greater bearing force at equivalent deflections (i.e., 10-20 microns) than standard bearing loads. This essentially increases the stiffness of the bearing by 25-33%. This will be true regardless of the direction of external loading such lateral, downward, upward, or as a rotational movement. The preloading for an interference fit can be obtained by adjusting the distance between the races. Such tight-fitting bearing is also enhanced by the positioning of the linear motors so that they apply some degree of magnetic attraction between the rails and bearing contacts.

Stiffening and Positioning Accuracy

As the thrust of a linear motor is increased, the mass of the motor tends to increase proportionally and imposes a heavier load on the support structure and lowers the stiffness of the support. Such weight increase is due to the dense ferromagnetic metal used not only in the permanent magnets of the armature but also in stator windings to achieve a flux density that will render such thrust force feasible. Such increase in thrust and mass to achieve higher accelerations/decelerations progressively defeats the ability to achieve accurate machining by decreasing the stiffness of the support structure and wasting much of the increased acceleration/deceleration capability, because the positioning distance is usually too short to allow attainment of maximum acceleration/deceleration.

Figure 11:
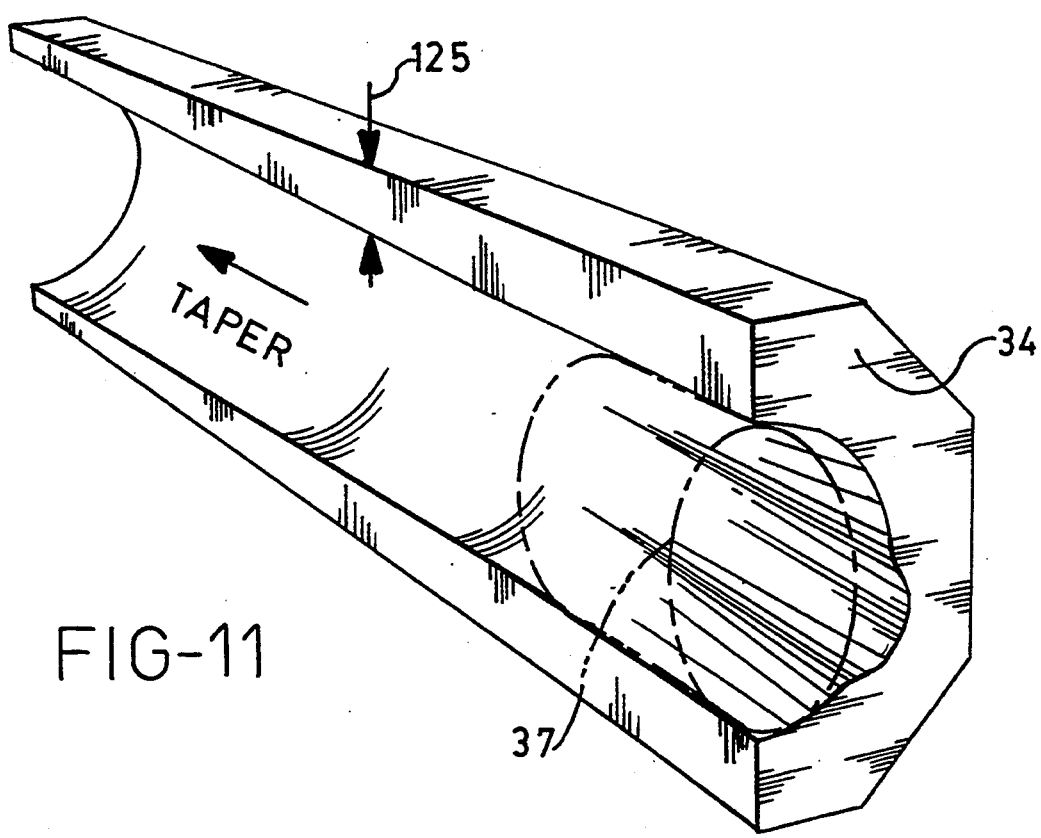
FIG. 11 is an enlarged schematic perspective view of the ram.

This invention has found that enhanced stiffness and machining accuracy can be achieved by: (a) increasing the natural frequency of the support structure to be in excess but near that of the operating frequency of the motor drive circuit (i.e., the bandwidth of the control velocity loop, as shown in FIG. 17); and (b) limiting motor thrust to that which achieves positioning accelerations/decelerations in the range of 0.5-1.5 G for such spindle. It is difficult to increase the natural structural frequency of the movable mass without increasing weight. The preferred embodiment obtains a natural frequency of about 100 Hz while supporting and moving a spindle that weighs about 400 pounds. The operable range for natural structural frequencies useful to this invention is about 90-200 Hz. The natural frequency of the support means for the movable mass herein was achieved by: (a) limiting the Y and Z axis support structure to be no longer than that needed for carrying the spindle throughout the cubed machining space and thereby reducing the movable mass (such as shown in FIGS. 12 and 13); (b) modifying the spring rate of the movable mass by (i) selecting a lighter weight, essentially nonmagnetic metal or composite material that provides a material stiffness of at least 500,000 pounds (i.e., aluminum); (ii) stretching a skin over a cellular, skeletonized column and cage structure of the movable mass that has been modified by finite element analysis (such as shown in FIG. 4); (iii) contouring the mounting faces of lightweight metal plates that form the table, slide, and cage of the movable mass; (iv) adding a tube ladder along any Y-axis sides of the column (see FIG. 10); and (v) reducing the wall thickness of the ram by tapering to provide only the reinforcement needed the more remote the location is from the spindle (see FIG. 11). It is desirable that the natural frequency of the resulting support structure be greater than the bandwidth of the control velocity loop while keeping both as close as possible to 100 Hz. When this is met, the positioner will have an exceptionally improved positioning accuracy within at least ±0.0010 inches and optimally ±0.0005 inches.

To increase the natural frequency of the support structure, so that its reaction to an imposed linear motor force causes it to flex with smaller amplitude, requires the elimination of nodal reflections, particularly the second dynamic mode of the movable element. It has been found that slow flexing in response to a sudden impact occurs greatest throughout the ram, cage, and remote tip of the column. To change such response, this invention forms the column as a hollow aluminum structure provided with a cast cellular skeleton (see FIGS. 4 and 10) upon which is attached a skin of aluminum plate. The skeleton cell size and flange dimension is determined by finite element analysis that allows for redistribution of aluminum material to provide sufficient stiffness against anticipated applied loads. The Y-axis side of the column is reinforced by attaching the tube ladder, as shown in FIG. 10, reducing the Y-axis length to that needed for traversing the cubed machining space. A composite graphite skin is stretched across spaced bulkhead skeleton of the cage; the ram structure 34 is tuned by tapering its reinforcement in a manner so that the ram thickness 125 is thinner the more remote from the spindle 37 (see FIG. 11); and since the X-axis forces tend to deflect the ram rails 87 transversely, such rails are constructed of ultra-stiff steel to counteract such tendency. The structure must be stiffened through redistribution of mass of the support structure that strengthen zones which experience the greatest stress upon X, Y, or Z axis acceleration or deceleration movements. Such redistribution must eliminate nodal reflections by making the movable elements of aluminum alloy, and modifying the elements' configuration using one or more of the following: the platform 12 has boxed side skirts and/or includes interior webs to support the linear motor coils, preferably in back-to-back arrangement; the platform has its width and length restricted to that needed only for the footprint of the column or columns; the column has at least one hollow tube-like structure, preferably a large-celled skeleton with any non-Y or non-X sides, sloping to create a pyramidal strengthened effect accompanied by a stretched or stressed skin on the skeleton; the Y-axis range of movement is limited to that needed to move the cutting tool through the cubed machining space; the skeleton has a ladder of tubes arranged along the Y-axis sides for reinforcement; the cage has a series of spaced bulkheads, joined at only one side, sufficient in length to support the linear motor coils required; the cage desirably has a composite graphite skin (thickness of about 0.5 inch) stretched across the bulkheads; and the ram is formed as a hollow cast element tuned to eliminate deflections by employing a linear taper in its wall thickness that becomes thinner the more remote the ram wall is from the supported spindle.

This invention has discovered that the ratio of the natural structural frequency of the positioning structure to the bandwidth (operating range of control system) for the velocity circuit 131 of FIG. 17 should be slightly in excess of one. Once the structural frequency has been increased and established, the bandwidth control frequency is set to be slightly below such value by setting the gains for such circuit to avoid unstable resonant frequencies. Three-phase DC brushless linear motors of about 1000 pounds thrust each are used, each having a peak current of 25 amperage and peak voltage of 200 with coils wired in series and motors wired in parallel; a 5000 Hz drive with sinusoidal commutation is used. If the natural frequency of the structure is below the linear motor control frequency, the imposed thrust forces will unduly excite the structure causing undesired flexing and inaccurate positioning of the machining tool.

Method of Machining

Figure 18:
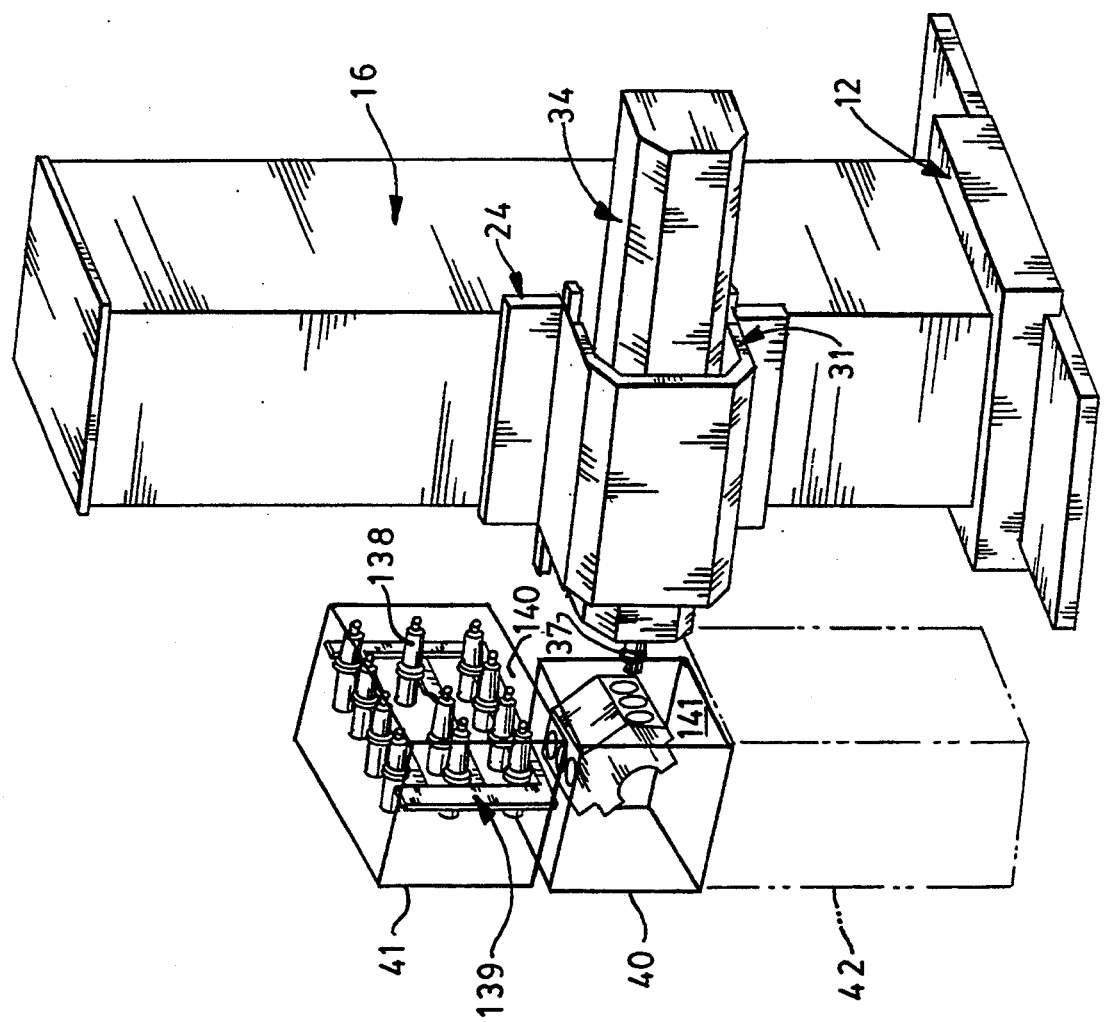
FIG. 18 is a schematic perspective view of a machining system using the positioner of this invention and showing a cubed machining space, a flexibly adjustable workpiece table and a tool inventory cubed space.
Figure 19:
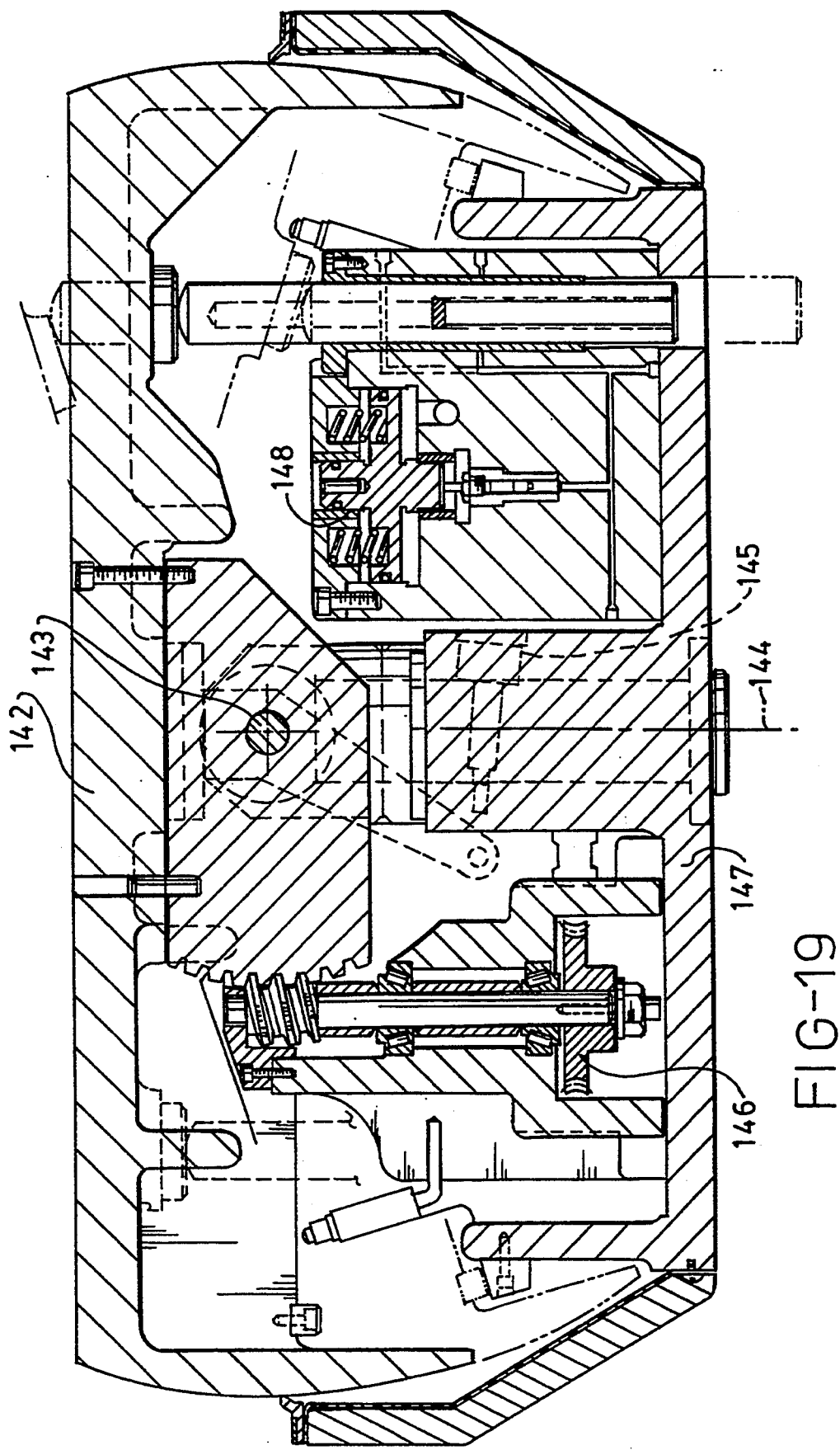
FIG. 19 is an enlarged horizontal sectional view of the worktable of FIG. 18.

As shown in FIG. 18, the single-spindle positioner of this invention uniquely cooperates with a cubed tool inventory space 41 for rapid change of machining tools 138 and with an adjustable pedestal assembly 42 for holding an aluminum-based workpiece during machining to carry out extremely rapid positioning and machining tasks. The machining system has unusual productivity flexibility in that it can be used for a single workpiece to be produced in high volume, or a plurality of different workpieces to be produced in lower volumes without need for dedicated machining heads. With linear motors providing 0.5–1.5 G acceleration/deceleration along any of the movement axes, the tool spindle 37 can be moved at positioning speeds of 2400–3000 inches per minute. This favorably compares to the best prior art positioning rates at 0.2 G acceleration/deceleration and velocities of up to 800 inches per minute. The positioning motion can be an integration of any of the X, Y, or Z vector components while attaining such speeds. With the spindle operable at rotary speeds up to 30,000–40,000 rpm, machining operations can be carried out at rates at least 10 times greater than that for the prior art. Feed rates can be at speeds of 1–1300 inches per minute for drilling and boring, and up to 10,000 sfm for milling. Aluminum workpieces can be drilled with carbide tools at feed rates of 90–250 inches per minute, boring at feed rates of 300 inches per minute, and milling at 500 surface feet per minute (sfm), all without sacrificing reasonable wear life of the tool.

The tool inventory is comprised of a rack 139 having a plurality of horizontal rows (here three in number) which define an inventory frontal space 140 that is commensurate to the frontal area 141 of the machining space. Each tool has its own quick-change tool holder (such as described in U.S. Pat. No. 4,979,853) to facilitate mechanized automated changing of such cutting tools. The time needed to make a tool change is critical to productivity and flexibility. Although the inventory space is shown as located immediately above and on top of the machining space (in substantially siamesed arrangement), a more optimal arrangement is to locate the inventory space siamesed to an upright side of the machining space. In this latter manner, the length of the Y-axis is shortened to that needed for machining use, while the X-axis is increased. Increasing the X-axis is more desirable since it does not add to the movable weight mass.

The adjustable pedestal assembly 42 comprises a worktable 142 that is tiltable about axis 143 and adjustable rotationally up to 360 degrees about an axis 144. The rotational adjustment is provided by an electro servomotor 145 on support 147 which locks in place by a coupling to provide rotational accuracy of ± one arc second. The tilting adjustment is provided by an electric servomotor which applies drive to a crank 146 for tilting; the servomotor is locked in place and is accurate to 10 arc second. The upper surface of the worktable has key ways and automatically actuated clamps 148 to hold a workpiece fixture in a desired orientation. The workpiece holding fixture accurately meshes with the key ways of the worktable. The fixture has contact surfaces to receive the specific workpiece, such as an engine block or an engine head, in one orientation to expose the desired surfaces normal to the Z-axis and thereby to the cutting tool. Rapid change of fixtures may be necessary to reorient a complex workpiece, such as an engine block, to expose other machining sites to the Z-axis.

Figure 20:
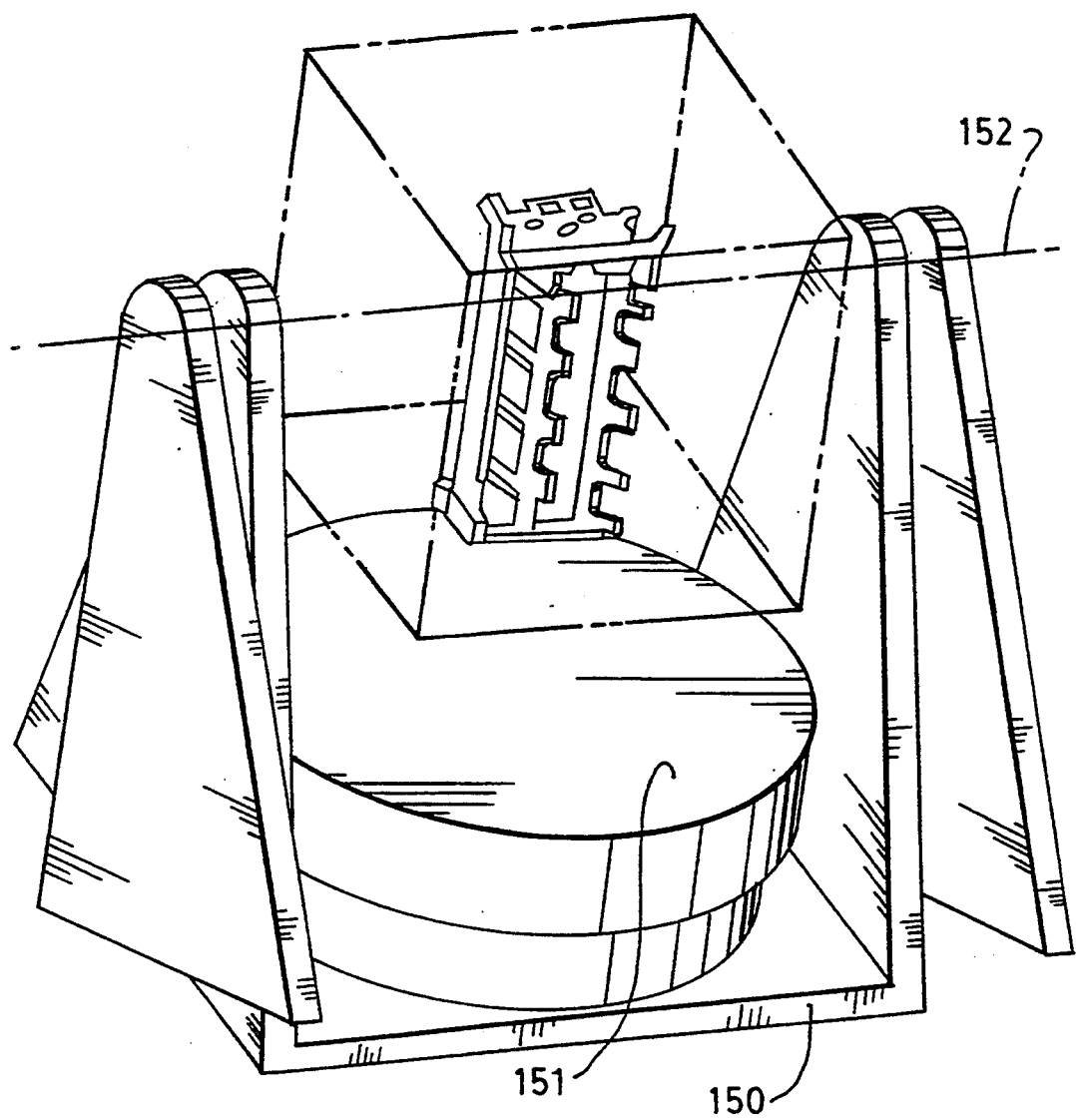
FIG. 20 is a schematic perspective view of an alternative worktable.

Positioning accuracy of the worktable can be improved by mounting the worktable 151 on a swing 150 (see FIG. 20) which permits the tilt axis 152 to be above the worktable and thereby enhance the speed and accuracy of adjustment while still retaining rotational flexibility. The worktable can be used in a unique manner by incorporating a high-force linear motor positioner to move the table in a Z-axis to facilitate speed of feed.

A method of machining in accordance with this invention would comprise: (a) supporting a rotary-driven spindle carrying a cutting tool by a plurality of relatively movable elements that provide for tool positioning within a predetermined machining space, the supporting providing for spindle movement having vectors along at least mutually perpendicular axes; (b) actuating relative movement of the elements by use of linear motors having a predetermined control circuit frequency less but near the natural frequency of said elements, the linear motors being effective to carry said tool at peak accelerations/decelerations of at least one G and at linear speeds up to 2400 inches per minute into the cubed machining space and to a location aligned with a machinable surface on a workpiece in the machining space; (c) thereafter using the linear motors to advance the rotationally-driven cutting tool at feed rates below the peak acceleration but at speeds of 1-1300 inches per minute for drilling and boring, and up to 10,000 surface feet per minute for milling; and (d) upon completion of the advancing task, withdrawing and repositioning the cutting tool at peak acceleration rates to a new location confronting the workpiece for carrying out a new machining task. The method may further comprise: (f) upon completion of a machining task, withdrawing the cutting tool at peak acceleration rates to position the spindle for automatic exchanging of cutting tools stationed in a cubed tool inventory space located next to and siamesed with the cubed machining space; and (g) upon completion of the tool exchange, moving the spindle at peak acceleration rates to a new machining location confronting the workpiece.

For example, in a drilling operation, the spindle and cutting tool would be moved from a start position by programmed actuation of X, Y, or Z axis linear motors under the control of a command module to move along a straight or compound path to a location adjacent the face to be drilled as determined by optical or mechanical scales. The Z-axis linear motor is then modulated to advance the rotary-driven tool into the workpiece that feeds up to 1300 inches per minute and to a depth as programmed. Upon completion of the drilling task, the tool bit is withdrawn along the Z-axis at withdrawal speeds of up to 2400 inches per minute, and when out of the drilled hole, the tool is advanced either to the next drilling location adjacent the face to be drilled (such advancement being along a linear compound path at speeds up to 2400-3000 inches per minute), depending on the distance of traverse, or to the tool inventory space to make a tool change. During travel to a new machining location, or travel to a turn from a tool change, the pedestal assembly may reorient the workpiece to facilitate advancement along the Z-axis for drilling, boring, or milling.

A typical duty cycle for drilling six holes of about two inches in length in a workpiece at the positioning speeds of this invention is equal to the duty cycle for machining all six holes by a prior art device using a gang of dedicated drills on a drill head which simultaneously drills all of the holes at one time.

As shown in FIG. 21, a plurality of three-axis positioning machines 10 may be employed to machine through all four side faces of the machining space 40. The positioners 10a-10d each have a rotary-driven spindle 102, for carrying a cutting tool supported by stacked linear motor movable elements 104, 105, 106, and 107. The positioners are arranged about a single workpiece table 108 for concurrent machining of more than one surface of a workpiece. The table 108 is movable by a linear motor actuated slide 109 (robotically) along a path 110 and the table is tiltable about an axis 111 located below. A fixture 112 is rigidly clamped to the table to hold the workpiece and overcome any hydraulic clamps. The embodiment of FIG. 21 illustrates the versatile architecture that may deploy the stacked linear motor positioner of this invention.

We claim:

1. A multiple-axis positioning machine for accurately placing and feeding a cutting tool, comprising;
   (a) support means for defining multiple axes of movement for the tool by use of stacked movable elements having a predetermined mass;
   (b) preloaded bearing means interposed with and between said movable elements to provide an interference movement fit; and
   (c) linear motor means associated with said movable elements sufficient in force to apply a selectively variable acceleration or deceleration thrust to each movable element that overcomes said bearing preload and is effective to move said tool at a maximum rate of at least 0.5 G, said linear motor means having a motor drive circuit with an operating frequency range close to but below the natural structural frequency of said support means.

2. The machine as in claim 1, in which said motor drive circuit has a control velocity loop and in which the ratio of the natural structural frequency to the frequency of the bandwidth of said control velocity loop is slightly in excess of one.

3. The machine as in claim 1, in which the natural structural frequency of said support means is in the range of 90-200 Hz.

4. The machine as in claim 1, in which said thrust of said linear motor means and the mass of said support means is limited to provide a maximum acceleration/deceleration in the range of 0.5-1.5 G.

5. The machine as in claim 1, in which the movement of said tool is limited to movement into and about a cubed machining space having a side dimension of at least one foot.

6. The machine as in claim 1, in which said movable elements of said support means are comprised substantially of aluminum.

7. The machine as in claim 1, in which said support means provides a material stiffness of at least about 0.5 million pounds.

8. The machine as in claim 1, in which said linear motor means is comprised of brushless DC linear motors.

9. A multiple-axis machine for positioning a rotary-driven spindle, such positioning being actuated by use of linear motors, comprising:
  (a) support means for defining said multiple axes, comprising:
    (i) a rigid vibration-dampening bed defining at least an X-axis;
    (ii) at least one hollow column defining a Y-axis and having one end adjacent and movable along said bed and the other end extending away from said bed;
    (iii) a slide adapted for movement along the Y-axis of said column;
    (iv) a cage rigidly fixed to said slide for defining a Z-axis way; and
    (v) a hollow ram slidable within said cage along said Z-axis way and carrying said spindle;
  (b) bearing means interposed between said column one end and said bed, between said column and slide, and between said cage and ram to provide for relative movement respectively along said axes, said bearing means being preloaded to provide an interference fit of 10–20% of the maximum bearing load; and
  (c) linear motor means interposed between said column one end and bed, between said column and slide, and between said cage and ram, said linear motor means being selectably actuatable to impose a high linear thrust force upon any or all of said column, slide, or ram for rapid respective movement along said axes, the ratio of the natural frequency of said support means to the electrical operating frequency of said linear motor means being slightly in excess of one.

10. The machine as in claim 9, in which said support means further comprises a platform joined to said column one end and supporting the footprint of said column, said platform, column, slide, cage, and ram being constituted of a lightweight, essentially nonmagnetic, metal.

11. The machine as in claim 10, in which said lightweight metal is aluminum-based.

12. The machine as in claim 10, in which said column is comprised of a cellular skeleton and a skin stretched across said skeleton.

13. The machine as in claim 12, in which said column skeleton has at least one sloped side independent of the Y-axis to increase the footprint area of said column.

14. The machine as in claim 12, in which said column has a ladder of tubes joined to said skeleton along at least one side of said column aligned with said Y-axis.

15. The machine as in claim 14, in which said bed, column, and cage each carries at least one pair of steel rails defining said respective X, Y, and Z axes.

16. The machine as in claim 15, in which said ram comprises a hollow cylinder having a tapered wall thickness, becoming thinner the more remote the wall is from the rotary-driven spindle.

17. The machine as in claim 16, in which said support means has a structural material frequency of at least 100 Hz.

18. The machine as in claim 9, in which said linear motor means for each axis of movement comprises at least one pair of brushless DC linear motors, each motor having one or more power-supplied coil packs and an independent row of permanent magnets.

19. The machine as in claim 18, in which said coil packs are arranged back-to-back with a cooling device therebetween.

20. The machine as in claim 18, in which said coil packs are arranged side-by-side with spacing therebetween.

21. The machine as in claim 20, in which the linear motor means between said column and slide has additional coil packs arranged to wrap around at least three sides of said column in spaced by side-by-side relationship arrangement, and having additional rows of permanent magnets for said additional coil packs.

22. The machine as in claim 18, in which said platform has a web depending therefrom with coil packs placed back-to-back thereon so as to be supported on opposite sides of said web.

23. The machine as in claim 9, which further comprises a counterbalance means effective to retain said slide and cage in a stationary position along the Y-axis when said linear motors means associated with said Y-axis is deactivated.

* * * * *